United States Patent
Kim et al.

(10) Patent No.: US 10,967,512 B2
(45) Date of Patent: Apr. 6, 2021

(54) MOVING ROBOT AND CONTROLLING METHOD

(71) Applicant: LG ELECTRONICS INC., Seoul (KR)

(72) Inventors: Jiwoong Kim, Seoul (KR); Hanmin Jo, Seoul (KR); Sunhee Cheon, Seoul (KR); Minwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 327 days.

(21) Appl. No.: 16/033,569

(22) Filed: Jul. 12, 2018

(65) Prior Publication Data
US 2019/0015985 A1    Jan. 17, 2019

(30) Foreign Application Priority Data
Jul. 12, 2017 (KR) .......................... 10-2017-0088536

(51) Int. Cl.
*B25J 9/16* (2006.01)
*G05D 1/00* (2006.01)
*B25J 11/00* (2006.01)

(52) U.S. Cl.
CPC ........... *B25J 9/1666* (2013.01); *B25J 9/1697* (2013.01); *B25J 11/0085* (2013.01); *G05D 1/0044* (2013.01); *G05D 2201/0203* (2013.01)

(58) Field of Classification Search
CPC .. G05D 1/0225; G05D 1/0234; G05D 1/0238; G05D 1/0274; G05D 1/0255;
(Continued)

(56) References Cited

U.S. PATENT DOCUMENTS

2006/0217840 A1\*  9/2006  Uehigashi ............. G05D 1/027
                                                     700/245
2009/0048727 A1   2/2009  Hong et al.
(Continued)

FOREIGN PATENT DOCUMENTS

JP   2012-239897   12/2012
JP   2014-229300   12/2014
(Continued)

OTHER PUBLICATIONS

European Search Report dated Nov. 15, 2018 issued in Application No. 18182933.4.
(Continued)

*Primary Examiner* — Jonathan L Sample
*Assistant Examiner* — B M M Hannan
(74) *Attorney, Agent, or Firm* — Ked & Associates, LLP

(57) ABSTRACT

A moving robot system includes a moving robot which travels a cleaning area, generates a map for the cleaning area, and moves based on the map; and a terminal which receives the map, sets at least one virtual wall in the map, and transmits the virtual wall to the moving robot, wherein the terminal sets an attribute for controlling operation of the moving robot in the virtual wall, and wherein the moving robot divides a travelable area in correspondence to the virtual wall and performs cleaning while traveling the cleaning area, and performs a specified operation according to the attribute specified to the virtual wall when reaching the virtual wall.

20 Claims, 14 Drawing Sheets

(58) Field of Classification Search
CPC ......... G05D 2201/0215; G05D 1/0246; G06N 3/008; A61B 19/22; A61B 19/5212; B25J 9/0003; B25J 13/085; B25J 9/1666; B25J 9/1676; B62D 15/027; G05B 2219/45083; G05B 19/4061; G05B 2219/39082
USPC .................. 700/243, 245, 255, 258, 262
See application file for complete search history.

(56) References Cited

U.S. PATENT DOCUMENTS

| | | | | |
|---|---|---|---|---|
| 2009/0182464 | A1* | 7/2009 | Myeong | G05D 1/0246 701/25 |
| 2010/0049364 | A1 | 2/2010 | Landry et al. | |
| 2012/0125363 | A1* | 5/2012 | Kim | A47L 9/2852 134/6 |
| 2013/0000675 | A1* | 1/2013 | Hong | G05D 1/0274 134/18 |
| 2013/0199570 | A1* | 8/2013 | Lee | G05D 1/0234 134/18 |
| 2014/0316636 | A1* | 10/2014 | Hong | G05D 1/0016 701/27 |
| 2015/0212500 | A1* | 7/2015 | Akabane | G05D 1/0044 700/275 |
| 2015/0250372 | A1 | 9/2015 | T P et al. | |
| 2016/0147230 | A1* | 5/2016 | Munich | G01C 21/206 701/28 |
| 2016/0171147 | A1* | 6/2016 | Chen | G06F 30/39 716/134 |
| 2016/0297072 | A1* | 10/2016 | Williams | B25J 9/1697 |
| 2017/0273527 | A1* | 9/2017 | Han | A47L 9/009 |
| 2018/0065253 | A1* | 3/2018 | Williams | B25J 9/1694 |
| 2018/0210452 | A1* | 7/2018 | Shin | A47L 9/009 |
| 2018/0348783 | A1* | 12/2018 | Pitzer | G05D 1/0246 |
| 2018/0373242 | A1* | 12/2018 | Han | A47L 9/2894 |

FOREIGN PATENT DOCUMENTS

| | | |
|---|---|---|
| KR | 10-2010-0092326 | 3/2011 |
| KR | 10-1297255 | 8/2013 |
| KR | 10-2012-0157844 | 7/2014 |
| KR | 10-2014-0126539 | 10/2014 |
| KR | 10-2015-0009048 | 1/2015 |
| KR | 10-2015-0014237 | 2/2015 |
| KR | 10-2017-0077756 | 7/2017 |

OTHER PUBLICATIONS

Korean Office Action dated Dec. 18, 2018 issued in Application No. 10-2017-0088536.

Kim Han-Gyeol et al.: "Experience based Domestic Environment and User Adaptive Cleaning Algorithm of a Robot Cleaner," 2014 11$^{th}$ International Conference on Ubiquitous Robots and Ambient Intelligence (URAI), IEEE, Nov. 12, 2014 (Nov. 12, 2014), pp. 176-178, XP032744369, DOI: 10.1109/URAI.2014.7057525.

Tan Ning et al.: "Robot Ergonomics: A Case Study of Chair Design for Roomba," 2015 24$^{th}$ IEEE International Symposium on Robot and Human Interactive Communication (Ro-Man), IEEE, Aug. 31, 2015 (Aug. 31, 2015), pp. 246-251, XP032815402, DOI: 10.1109/Roman.2015.7333566.

European Search Report dated Nov. 21, 2018 issued in Application No. 18182949.0.

Korean Office Action dated Dec. 16, 2018 issued in Application No. 10-2017-0088535.

* cited by examiner (a)

(b)

(a)

(b)

(a)

(b)

MOVING ROBOT AND CONTROLLING METHOD

CROSS-REFERENCE TO RELATED APPLICATION

This application claims the priority benefit of Korean Patent Application No. 10-2017-0088536, filed on Jul. 12, 2017 in the Korean Intellectual Property Office, the disclosure of which is incorporated herein by reference.

BACKGROUND

1. Field

The present disclosure relates to moving robot system and a control method thereof, and more particularly, to a moving robot system for performing cleaning by traveling in a cleaning area and a control method thereof.

2. Background

Generally, a moving robot is an apparatus that automatically performs cleaning without user's handling by suctioning foreign substances such as dust from a floor surface while traveling within an area to be cleaned. Such a moving robot detects the distance to an obstacle such as furniture, office supplies, and a wall installed in the cleaning area, and performs an obstacle avoidance operation.

However, even if the moving robot detects an obstacle, since the moving robot changes a path or moves to another path to perform cleaning after approaching the obstacle, the obstacle may be damaged as the moving robot approaches the obstacle. Furthermore, in some cases, the moving robot cannot escape the area after entering a certain area. Accordingly, in order to solve such a problem of the moving robot, it is sought to prevent approaching some portion of the cleaning area at the time of cleaning setting.

An apparatus for generating a certain signal to prevent the moving robot from approaching is installed in the cleaning area so that the moving robot is prevented from approaching the area set by the apparatus. However, when using the apparatus for generating a signal, the moving robot cannot know the position and size of the area set by the signal, and therefore, there is a problem that the moving robot repeatedly detects the signal while moving.

In addition, Korean Patent Application No. 10-2010-0092326 utilizes an external apparatus having indicator and virtual wall setting functions so that a cleaning operation by the cleaning robot can be performed based on a cleaning zone reference point in block units, thereby enabling to perform cleaning smoothly without a remaining area to be cleaned. However, in order to install a virtual wall, one or more physical external apparatuses are required, and a user should carry the apparatus and move to a required position to install the apparatus in person as the virtual wall is set by using a physical apparatus. Accordingly, there is a problem that the user is required to move and the apparatus should be moved each time to change the position of the virtual wall.

In addition, in Korean Patent Application No. 10-2012-0157844, it is disclosed that virtual wall information is previously additionally provided on the map of the robot from a robot manager so as to avoid a path set as the virtual wall when setting a travel path of the robot. However, the virtual wall of Korean Patent Application No. 10-2012-0157844 provides only the function of avoiding when the cleaning robot approaches. Therefore, although the user can restrict the cleaning area by utilizing this function, there is a limitation in setting.

The above references are incorporated by reference herein where appropriate for appropriate teachings of additional or alternative details, features and/or technical background.

BRIEF DESCRIPTION OF THE DRAWINGS

Embodiments will be described in detail with reference to the following drawings in which like reference numerals refer to like elements, and wherein.

DETAILED DESCRIPTION

Exemplary embodiments of the present disclosure are described with reference to the accompanying drawings in detail. Detailed descriptions of well-known functions and structures incorporated herein may be omitted to avoid obscuring the subject matter of the present disclosure.

Figure 1:
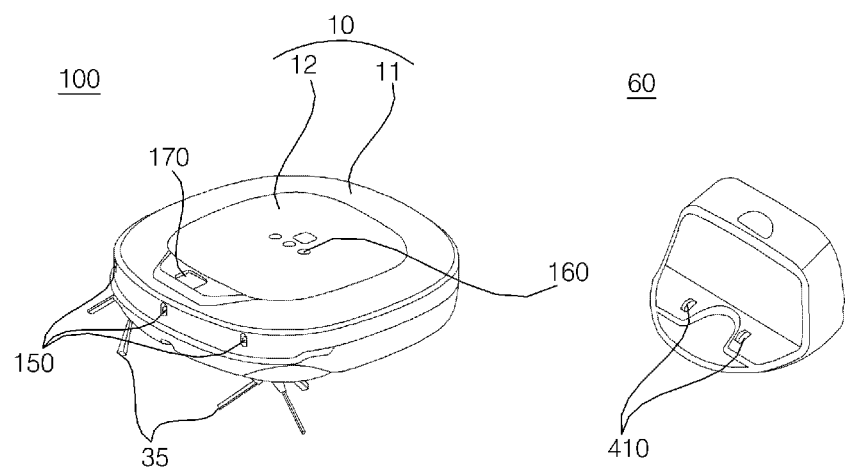
FIG. 1 is a perspective view illustrating a moving robot of a moving robot system according to an embodiment of the present disclosure.
Figure 1:
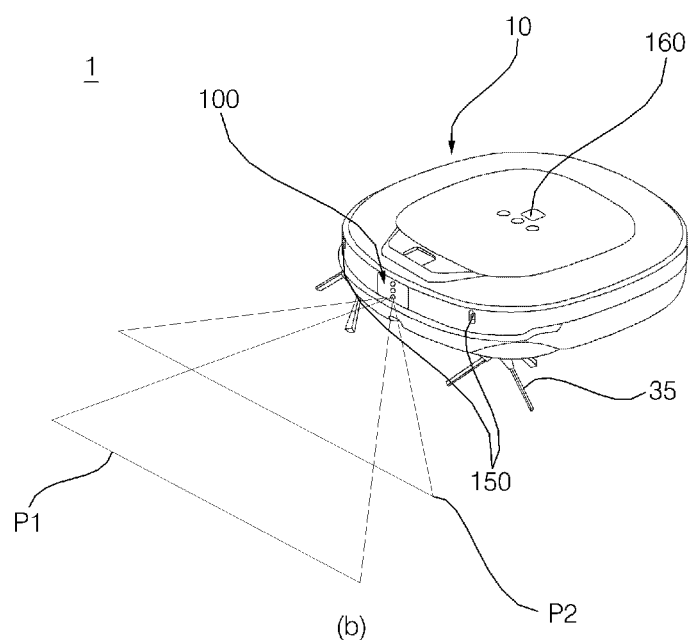
Figure 2:
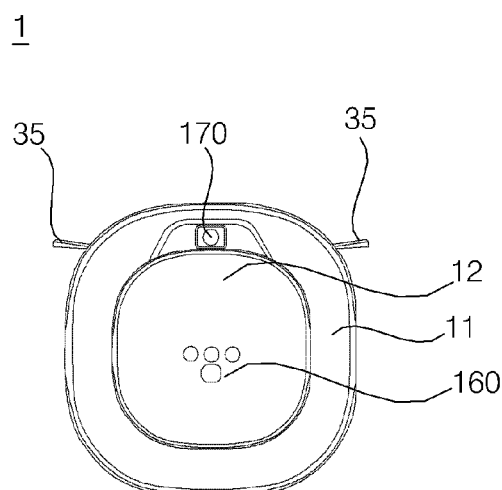
FIG. 2 is a view illustrating a horizontal angle of view of the moving robot of FIG. 1.
Figure 2:
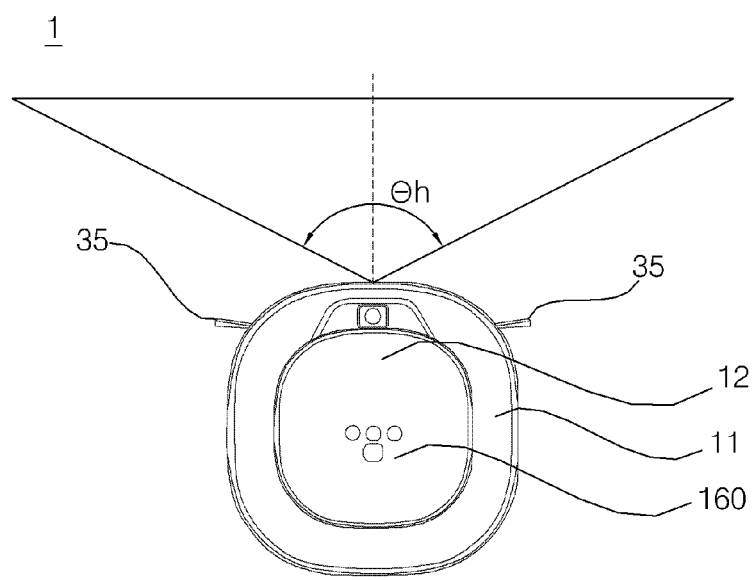
Figure 3:
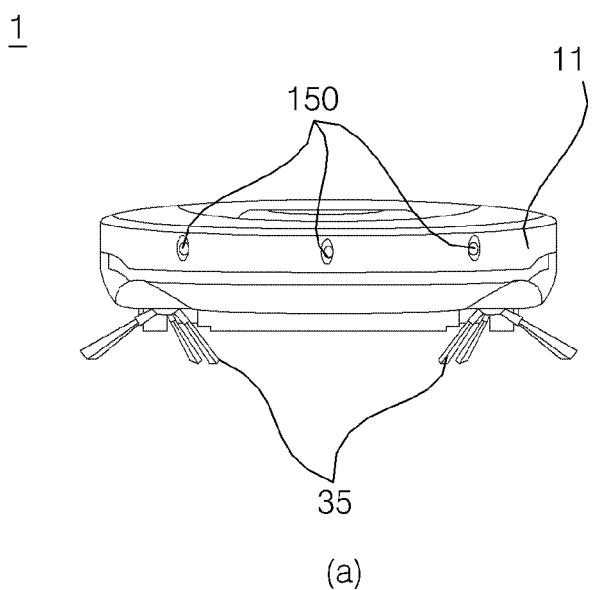
FIG. 3 is a front view of the moving robot of FIG. 1.
Figure 3:
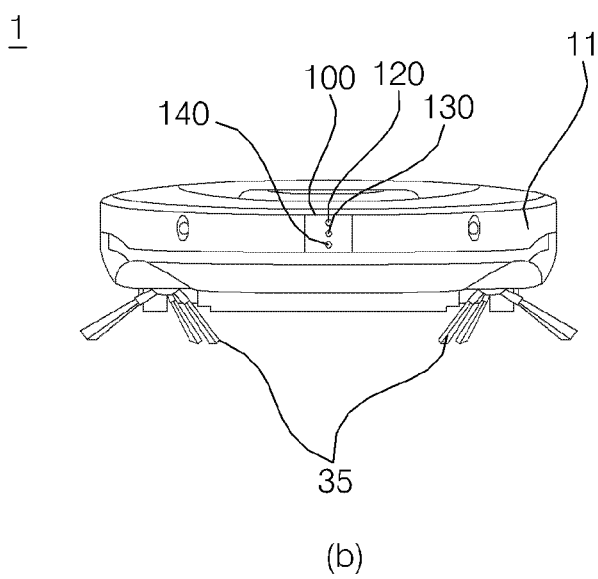
Figure 4:
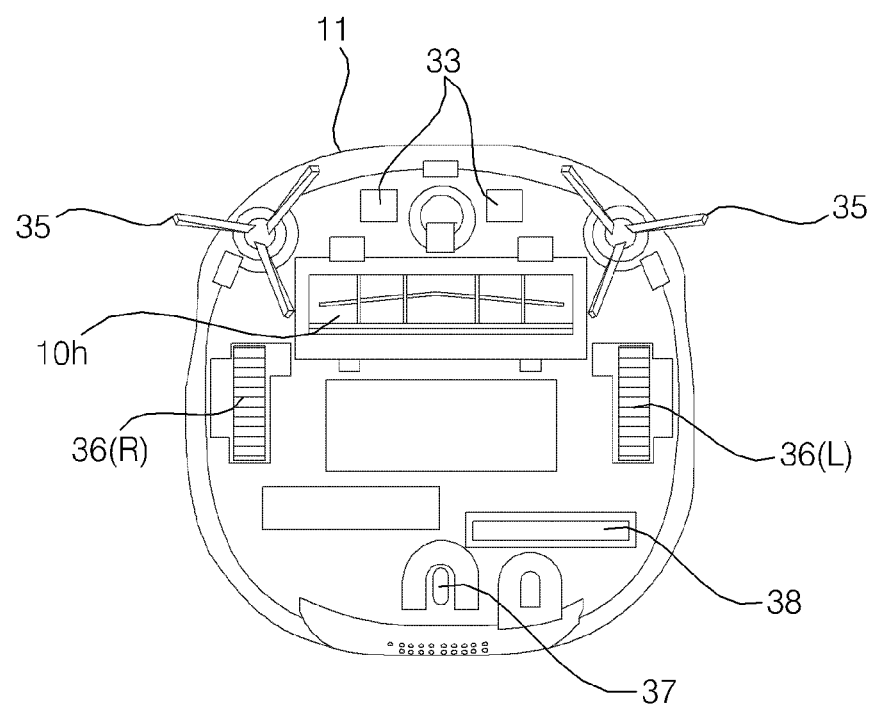
FIG. 4 is a bottom view of the moving robot of FIG. 1.

FIG. 1 is a perspective view illustrating a moving robot of a moving robot system according to an embodiment of the present disclosure, FIG. 2 is a view illustrating a horizontal angle of view of the moving robot of FIG. 1, FIG. 3 is a front view of the moving robot of FIG. 1, and FIG. 4 is a bottom view of the moving robot of FIG. 1. Referring to FIG. 1 to FIG. 4, a moving robot (or autonomous cleaner) 1 according to an embodiment of the present disclosure may include a main body 10 which moves along the floor of a cleaning area and sucks foreign substances such as dust on the floor, and at least one detection device which is disposed on the front surface of the main body 10 and detects an obstacle.

The main body 10 may include a casing 11 forming an outer shape and defining a space for accommodating parts constituting the main body 10 therein, a suction unit 34 disposed in the casing 11 and sucking foreign substances such as dust or trash, and a left wheel 36(L) and a right wheel 36(R) which are rotatably provided in the casing 11. As the left wheel 36(L) and the right wheel 36(R) rotate, the main body 10 may move along the floor of the cleaning area and, during this process, foreign substances may be sucked through the suction unit 34.

The suction unit 34 may include a suction fan (not shown) for generating a suction force and a suction port 10h for sucking the airflow generated by the rotation of the suction fan. The suction unit 34 may include a filter (not shown) for collecting foreign substances from the airflow sucked through the suction port 10h and a foreign substance collecting box (not shown) in which foreign substances collected by the filter are accumulated.

In addition, the main body 10 may include a travel drive unit for driving the left wheel 36(L) and the right wheel 36(R). The travel drive unit may include at least one drive motor. The at least one drive motor may include a left wheel drive motor for rotating the left wheel 36(L) and a right wheel drive motor for rotating the right wheel 36(R).

The left wheel drive motor and the right wheel drive motor may be controlled independently by a travel controller of a controller, so that the main body 10 can go forward, backward, or turn round. For example, when the main body 10 travels straight, the left wheel drive motor and the right wheel drive motor may be rotated in the same direction. However, when the left wheel drive motor and the right wheel drive motor are rotated at a different speed or rotated in the opposite direction, the travel direction of the main body 10 can be changed. At least one auxiliary wheel 37 for stable support of the main body 10 may be further provided.

A plurality of brushes 35, which are located on the front side of the bottom surface of the casing 11 and have a plurality of radially extending feathering, may be further provided. The dusts may be removed from the floor of the cleaning area by the rotation of the brushes 35, so that the dusts separated from the floor may be sucked through the suction port 10h and gathered in the collecting box.

A control panel including an operation unit (or user interface) 160 for receiving various commands for controlling the moving robot 1 from a user may be provided on the upper surface of the casing 11.

The detection device may include, as shown in section (a) of FIG. 1, a sensor unit (or sensor) 150 for sensing an obstacle by using a plurality of sensors, and an image acquisition unit (also referred to as a camera or image sensor) 140, 170 for photographing an image.

In addition, as shown in section (b) of FIG. 1, the detection device may include an obstacle sensing unit (also referred to as an obstacle detector or obstacle sensor) 100 disposed on the front surface of the main body 10 for sensing an obstacle by irradiating a light pattern with the sensed image. The obstacle detection unit 100 may include an image acquisition unit (also referred to as a camera or an image sensor) 140, and the sensing unit may include both an obstacle detection unit 100 and a sensor unit 150.

The image acquisition unit 140 may be provided, as shown in section (a) of FIG. 2, to face the ceiling or may be provided, as shown in section (b) of FIG. 3, to face the front. Optionally, any one image acquisition unit 140 may be provided or both of the image acquisition units 140 facing the front and the ceiling may be provided.

An obstacle detection unit 100 may be disposed on the front surface of the main body 10. The obstacle detection unit 100 may be fixed to the front surface of the casing 11, and may include a first pattern irradiation unit 120, a second pattern irradiation unit 130, and the image acquisition unit 140. At this time, basically, as shown in the drawing, the image acquisition unit 140 may be installed below the pattern irradiation unit 120, 130, but may be optionally disposed between the first and second pattern irradiation units 120, 130.

In addition, as described above, a second image acquisition unit (170) may be further provided at an upper end or upper surface of the main body. The second image acquisition unit may capture an image from an upper end portion of the main body, i.e., an image of a ceiling.

The main body 10 may be provided with a rechargeable battery 38. A charging terminal 33 of the battery 38 may be connected to a commercial power source (e.g., a power outlet in a home), or the main body 10 may be docked to a separate charging stand 60 connected to the commercial power source, so that the charging terminal 33 can be electrically connected to the commercial power source, and the battery 38 can be charged. Electric components constituting the moving robot 1 may be supplied with power from the battery 38. Therefore, in a state where the battery 38 is charged. The moving robot 1 can perform an automatic travelling while being electrically disconnected from the commercial power source.

Figure 5:
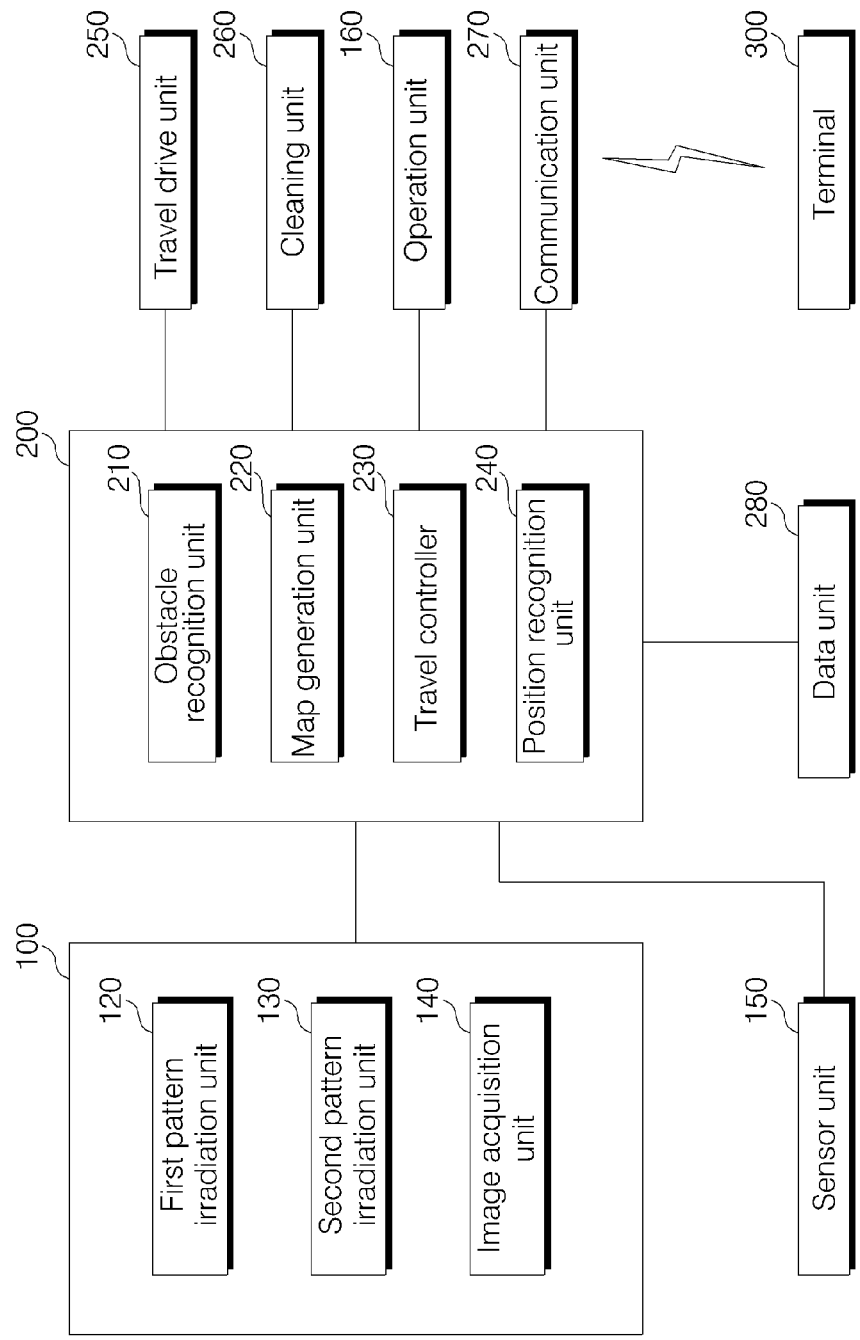
FIG. 5 is a block diagram illustrating main parts of a moving robot according to an embodiment of the present disclosure.

FIG. 5 is a block diagram illustrating main parts of a moving robot according to an embodiment of the present disclosure. As shown in FIG. 5, the moving robot 1 may include a travel drive unit (or drive motor) 250, a cleaning unit (or cleaning head) 260, a data unit (or memory) 280, an obstacle detection unit (or obstacle detection sensor) 100, a sensor unit (or sensor) 150, a communication unit (or communication interface or antenna) 270, an operation unit (or user interface) 160, and a controller 200 for controlling overall operation. The controller may be implemented by one or more microprocessors, and may be implemented by a hardware apparatus.

The operation unit 160 may include at least one input device such as button, switch, touch pad, to receive a user command. The operation unit may be provided at the upper end of the main body 10, as described above.

The data unit 280 may store an obstacle detection signal input from the obstacle detection unit 100 or the sensor unit 150, may store reference data that is necessary for an obstacle recognition unit 210 to determine an obstacle, and may store obstacle information related to detected obstacle. In addition, the data unit 280 may store control data for controlling the operation of the moving robot and data according to a cleaning mode of the moving robot, and store a map, generated by a map generator, including obstacle information. The data unit 280 may store a basic map, a cleaning map, a user map, and a guide map. The obstacle detection signal may include a detection signal such as an ultrasonic wave/laser by the sensor unit, and an acquisition image of the image acquisition unit.

The data unit 280 may store data that can be read by a microprocessor and may include a hard disk drive (HDD), a solid state disk (SSD), a silicon disk drive (SDD), ROM, RAM, CD-ROM, a magnetic tape, a floppy disk, and an optical data storage apparatus.

The communication unit 270 may communicate with a terminal (not shown) in a wireless communication manner. In addition, the communication unit 270 may be connected to the Internet network through an in-home network, and may communicate with an external server or a terminal controlling the moving robot.

The communication unit 270 may transmit the generated map to the terminal, receive a cleaning command from the terminal, and transmit data related to the operation state of the moving robot and the cleaning state to the terminal. The communication unit 270 may include not only a short-distance wireless communication module such as ZigBee, Bluetooth but also a communication module such as Wi-Fi, WiBro to transmit and receive data.

Meanwhile, the terminal may be an apparatus in which a communication module is mounted to achieve a network connection and a program for controlling the moving robot or an application for controlling the moving robot is installed, and may be a computer, a laptop, a smart phone, a PDA, a tablet PC, or the like. In addition, the terminal may be a wearable apparatus such as a smart watch.

The travel drive unit 250 may include at least one drive motor and allow the moving robot to travel according to a control command of a travel controller 230. As described above, the travel drive unit 250 may include the left wheel drive motor for rotating the left wheel 36(L) and the right wheel drive motor for rotating the right wheel 36(R).

The cleaning unit 260 may operate a brush to form a state for easily sucking dust or foreign substances around the moving robot, and operate a suction apparatus to suck the dust or foreign substances. The cleaning unit 260 may control the operation of the suction fan included in the suction unit 34 that sucks foreign substances such as dust or trash so that the dust may be introduced into the foreign substance collecting box through the suction port.

The obstacle detection unit 100 may include the first pattern irradiation unit 120, the second pattern irradiation unit 130, and the image acquisition unit 140. The sensor unit 150 may include a plurality of sensors to assist the detection of failure. The sensor unit 150 may sense an obstacle in front of the main body 10, i.e., in the travel direction, by using at least one of a laser, an ultrasonic wave, and an infrared ray. When the transmitted signal is reflected and inputted, the sensor unit 150 may input information on the presence of an obstacle or a distance to the obstacle to the controller 200 as an obstacle detection signal.

In addition, the sensor unit 150 may include at least one tilt sensor to detect the tilt of the main body. The tilt sensor may calculate the tilted direction and angle, when being tilted to the front, rear, left, and right directions of the main body. The tilt sensor may be a tilt sensor, an acceleration sensor, or the like. In the case of the acceleration sensor, any one of gyro type, inertial type, and silicon semiconductor type may be used.

As described above, in the obstacle detection unit 100, the first pattern irradiation unit 120, the second pattern irradiation unit 130, and the image acquisition unit 140 may be installed in the front surface of the main body 10 to irradiate lights of first and second patterns (P1, P2) to the front of the moving robot 10, and may acquire an image by photographing a light of the irradiated pattern. The obstacle detection unit 100 may input the acquisition image to the controller 200 as an obstacle detection signal.

The first and second pattern irradiation units 120 and 130 of the obstacle detection unit 100 may include a light source, and an optical pattern projection element (OPPE) that generates a certain pattern by transmitting the light irradiated from the light source. The light source may be a laser diode (LD), a light emitting diode (LED), or the like. Laser light may be superior to other light sources in terms of monochromaticity, straightness, and connection characteristics, thereby achieving a precise distance measurement. In particular, the infrared light or visible light may incur variation significantly in the accuracy of the distance measurement depending on a factor such as the color and the material of the object. Accordingly, a laser diode is preferable as a light source. The optical pattern projection element (OPPE) may include a lens, and a diffractive optical element (DOE). Various patterns of light may be irradiated according to the configuration of the OPPE included in each of the pattern irradiation units 120 and 130.

The first pattern irradiation unit 120 may irradiate a light of the first pattern P1 (hereinafter, referred to as a first pattern light) toward the front lower side of the main body 10. Therefore, the first pattern light P1 may be incident on the floor of the cleaning area. The first pattern light P1 may be formed in the form of a horizontal line Ph. In addition, it is possible that the first pattern light P1 is formed in the form of a cross pattern in which the horizontal line Ph and a vertical line Pv intersect each other.

The first pattern irradiation unit 120, the second pattern irradiation unit 130, and the image acquisition unit 140 may be vertically arranged in a line. The image acquisition unit 140 may be disposed below the first pattern irradiation unit 120 and the second pattern irradiation unit 130. However, the present disclosure is not limited thereto, and the image acquisition unit 140 may be disposed above the first pattern irradiation unit 120 and the second pattern irradiation unit 130.

In an embodiment, the first pattern irradiation unit 120 may be located in the upper side and may irradiate the first pattern light P1 downwardly toward the front to detect an obstacle located below the first pattern irradiation unit 120. The second pattern irradiation unit 130 may be located below the first pattern irradiation unit 120 and may irradiate a light of the second pattern (P2, hereinafter, referred to as a second pattern light) upwardly toward the front. Accordingly, the second pattern light P2 may be emitted to a wall or an obstacle or a certain portion of the obstacle located at least higher than the second pattern irradiation unit 130 from the floor of the cleaning area. The second pattern light P2 may have a pattern different from that of the first pattern light P1, and preferably may include a horizontal line. Here, the horizontal line is not necessarily a continuous line segment, but may be a dotted line.

Meanwhile, in FIG. 2, the irradiation angle θh may indicate a horizontal irradiation angle of the first pattern light P1 irradiated from the first pattern irradiation unit 120, and represent an angle formed between both ends of the horizontal line Ph and the first pattern irradiation unit 120. It is preferable that the irradiation angle is set in the range of 130 degrees to 140 degrees, but is not limited thereto. The dotted line shown in FIG. 2 may be directed toward the front of the moving robot 1, and the first pattern light P1 may be configured to be symmetrical with respect to the dotted line.

Similarly to the first pattern irradiation unit 120, the horizontal irradiation angle of the second pattern irradiation unit 130 may be defined, preferably, in the range of 130 to 140 degrees. According to an embodiment, the second pattern irradiation unit 130 may irradiate the pattern light P2 at the same horizontal irradiation angle as the first pattern irradiation unit 120. In this case, the second pattern light P2 may also be formed symmetrically with respect to the dotted line shown in FIG. 2.

The image acquisition unit 140 may acquire an image in front of the main body 10. Particularly, the pattern light P1 and P2 may appear in the image acquired by the image acquisition unit 140 (hereinafter, referred to as an acquisition image). Hereinafter, the image of the pattern light P1 and P2 displayed in the acquisition image may be referred to as a light pattern. Since this is substantially an actual image, formed in an image sensor, of the pattern light P1 and P2 incident on an space, the same reference numeral as the pattern lights P1 and P2 may be assigned. Thus, the images corresponding to the first pattern light P and the second pattern light P2 respectively may be referred to as a first light pattern P1 and a second light pattern P2.

The image acquisition unit 140 may include a digital camera that converts an image of an object into an electrical signal and then converts into a digital signal to store the digital signal in a memory apparatus. The digital camera may include an image sensor (not shown) and an image processing unit (not shown).

The image sensor may be an apparatus for converting an optical image into an electrical signal. The image sensor may be composed of a chip on which a plurality of photo diodes are integrated, and the photodiode may be a pixel. Charges may be accumulated in the respective pixels by the image, formed in the chip, of the light passing through a lens. The charges accumulated in the pixel may be converted into an electrical signal (e.g., a voltage). A charge coupled apparatus (CCD) and a complementary metal oxide semiconductor (CMOS) are well known as the image sensor.

The image processing unit may generate a digital image based on an analog signal output from the image sensor. The image processing unit may include an AD converter for converting an analog signal into a digital signal, a buffer memory for temporarily storing digital data according to the digital signal output from the AD converter, and a digital signal processor (DSP) for processing the data stored in the buffer memory and configuring a digital image.

The controller 200 may include the obstacle recognition unit 210, a map generation unit 220, the travel controller 230, and a position recognition unit 240. The obstacle recognition unit 210 may determine an obstacle through the acquisition image input from the obstacle detection unit 100. The travel controller 230 may control the travel drive unit 250 to change the moving direction or the travel path in response to obstacle information to pass the obstacle or to avoid the obstacle.

The travel controller 230 may control the travel drive unit 250 to independently control the operation of the left and right wheel drive motors so that the main body 10 can travel straight or turn. The obstacle recognition unit 210 may store an obstacle detection signal input from the sensor unit 150 or the obstacle detection unit 100 in the data unit 280, and analyze the obstacle detection signal to determine an obstacle.

The obstacle recognition unit 210 may determine whether obstacle exists ahead based on the signal of the sensor unit, and analyze the acquisition image to determine the position, size, and shape of the obstacle. The obstacle recognition unit 210 may analyze the acquisition image and extract a pattern. The obstacle recognition unit 210 may extract a light pattern which is generated when the light of the pattern irradiated from the first pattern irradiation unit or the second pattern irradiation unit is irradiated on the floor or the obstacle, and determine an obstacle based on the extracted light pattern.

The obstacle recognition unit 210 may detect the light pattern P1 and P2 from the image (acquisition image) acquired by the image acquisition unit 140. The obstacle recognition unit 210 may detect feature such as point, line, surface, and the like with respect to certain pixels constituting the acquisition image, and detect the light pattern P1 and P2 or the point, line, surface, and the like that constitute the pattern P1 and P2 based on the detected feature.

The obstacle recognition unit 210 may extract lines constituted by successive pixels brighter than the surrounding area, and extract a horizontal line Ph constituting the first light pattern P1 and a horizontal line constituting the second light pattern P2. However, the present disclosure is not limited thereto. Various techniques for extracting a desired pattern from a digital image are already known, and the obstacle recognition unit 210 may extract the first light pattern P1 and the second light pattern P2 by using known techniques.

In addition, the obstacle recognition unit 210 may determine the presence of an obstacle based on the detected pattern, and determine the shape of the obstacle. The obstacle recognition unit 210 may determine an obstacle through the first light pattern and the second light pattern, and calculate the distance to the obstacle. In addition, the obstacle recognition unit 210 may determine the size (height) and the shape of the obstacle through the shape of the first light pattern and the second light pattern, and the change of the light pattern displayed when approaching the obstacle.

The obstacle recognition unit 210 may determine an obstacle based on the distance to a reference position with respect to the first and second patterns. When the first light pattern P1 appears in a position lower than the reference position, the obstacle recognition unit 210 may determine that a downward ramp exists. When the first light pattern P1 disappears, the obstacle recognition unit 210 may determine that there exists a cliff. In addition, when the second light pattern appears, the obstacle recognition unit 210 may determine a forward obstacle or an upper obstacle.

The obstacle recognition unit 210 may determine whether the main body is tilted, based on tilt information input from the tilt sensor of the sensor unit 150. When the main body is tilted, the obstacle recognition unit 210 may compensate the tilt with respect to the position of the light pattern of the acquisition image.

The travel controller 230 may control the travel drive unit 250 to travel in a specified area of the cleaning area and perform cleaning, and control the cleaning unit 260 to perform cleaning by sucking dust while traveling. In correspondence to the obstacle recognized by the obstacle recognition unit 210, the travel controller 230 may determine whether it is possible to travel or to enter, and control the travel drive unit 250 to set a travel path so as to approach the obstacle and travel, pass the obstacle, or avoid the obstacle.

The map generation unit 220 may generate a map of the cleaning area, based on the information of the obstacle determined by the obstacle recognition unit 210. The map generation unit 220 may generate a map for the cleaning area based on the obstacle information while traveling the cleaning area, in the initial operation or when the map for the cleaning area is not stored. In addition, the map generation unit 220 may update a pre-generated map, based on the obstacle information acquired during the traveling.

The map generation unit 220 may generate a basic map based on the information acquired from the obstacle recognition unit 210 during the traveling, and generate a cleaning map by dividing the area from the basic map. In addition, the map generation unit 220 may readjust the area for the cleaning map and set an attribute for the area to generate a user map and a guide map.

The basic map may be a map in which the shape of the cleaning area acquired through traveling is displayed as an outline, and the cleaning map may be a map in which the area is divided in the basic map. The basic map and the cleaning map may include the movable area of the moving robot and the obstacle information. The user map may be a map which simplifies the area of the cleaning map and readjust and process the shape of the outline, and is added with visual effects. The guide map may be a map in which the cleaning map and the user map are superimposed. Since the cleaning map is displayed in the guide map, a cleaning command may be inputted based on the area where the moving robot can actually travel.

After generating the basic map, the map generation unit 220 may generate a map by including a connection path for dividing the cleaning area into a plurality of areas and connecting the plurality of areas, and including information on an obstacle in the respective areas. The map generation unit 220 may set a representative area by dividing a small area so as to divide an area on a map, and set the divided small area as a separate detail area to be merged into the representative area, thereby generating a map in which the area is divided.

The map generation unit 220 may process the shape of the area for each of the divided areas. The map generation unit 220 may set an attribute for the divided area, and process the shape of the area according to the attribute for each area.

The map generation unit 220 may first determine a main area based on the number of contact points with other areas, in each of the divided areas. The main area may be, basically, a living room, but the main area may be changed to any one of a plurality of rooms in some cases. The map generation unit 220 may set the attribute for the remaining area based on the main area. For example, the map generation unit 220 may set an area of a certain size or more disposed based on the living room, which is a main area, as a room, and set the other areas as other area.

The map generation unit 220 may process the shape of the area so that each area may have a specific shape according to a criterion according to the attribute of the area. For example, the map generation unit 220 may process the shape of an area based on a typical family room type, e.g., a square. In addition, the map generation unit 220 may process the shape of an area by expanding the shape of the area based on the outermost cell of the basic map, and deleting or reducing the area with respect to the area that cannot be approached due to an obstacle.

In addition, depending on the size of the obstacle, in the basic map, the map generation unit 220 may display an obstacle having a certain size or larger on the map, and delete a corresponding cell of the obstacle less than a certain size to prevent the obstacle from being displayed. For example, the map generation unit may display furniture such as a chair, a sofa, or the like having a certain size or more on a map, and delete a temporary obstacle, e.g., a small toy from the map. The map generation unit 220 may store the position of a charging stand together with a map when generating the map.

The map generation unit 220 may add an obstacle to the map based on the obstacle information input from the obstacle recognition unit 21, with respect to the detected obstacle, after generating the map. The map generation unit 220 may add an obstacle to the map when a specific obstacle is repeatedly detected at a fixed position, and ignore the obstacle when the obstacle is temporarily detected. The map generation unit 220 may generate both the user map, which is a map of the processed form, and the guide map, which is displayed by superimposing the user map and the cleaning map.

When a virtual wall is set by a terminal 300, the map generation unit 220 may set the position of the virtual wall to the cleaning map based on the data of the virtual wall received through the communication unit, and calculate the coordinate of the virtual wall corresponding to the cleaning area. The map generation unit 220 may register the virtual wall in the cleaning map as an obstacle.

The map generation unit 220 may store data about the set virtual wall, e.g., information on the level of the virtual wall and the attribute of the virtual wall. The map generation unit 220 may expand the virtual wall set by the terminal and register it as an obstacle. During the traveling, the map generation unit 220 may expand the set virtual wall and set to a wider range so that the main body 10 cannot be in contact with or cannot intrude into the virtual wall.

When the current position of the main body 10 cannot be determined by the position recognition unit 240, the map generation unit 220 may generate a new map for the cleaning area. The map generation unit 220 may determine that the main body 10 has moved to a new area and initialize a preset virtual wall.

When the data on the virtual wall is received from the terminal during traveling, the map generation unit 220 may additionally set a virtual wall on the map so that the main body 10 can travel in correspondence to the virtual wall when travelling. For example, when a new virtual wall is added or the level or attribute of the virtual wall is changed, and when a position of a preset virtual wall is changed, the map generation unit 220 may update the map based on the received data, so that information on the changed virtual wall can be reflected in the map.

The moving robot may perform the cleaning based on the cleaning map, and transmit the user map and the guide map to the terminal. The terminal 300 may store both the guide map and the user map to display on the screen, and output one of them according to the setting. When a cleaning command based on the user map or the guide map is input from the terminal 300, the moving robot 1 may travel based on the cleaning map and clean a specified area.

The position recognition unit 240 may determine the current position of the main body 10 based on the map (cleaning map, guide map, or user map) stored in the data unit.

When the cleaning command is input, the position recognition unit 240 may determine whether the position on the map is coincident with the current position of the main body 10. When the current position is not coincident with the position on the map or when the current position cannot be determined, the position recognition unit 240 may recognize the current position and restore the current position of the moving robot 1. When the current position is restored, the travel controller 230 may control the travel drive unit to move to a specified area based on the current position. The cleaning command may be input from a remote controller (not shown), the operation unit 160, or the terminal 300.

When the current position is not coincident with the position on the map or when the current position cannot be determined, the position recognition unit 240 may analyze the acquisition image input from the image acquisition unit 140 and estimate the current position based on the map. The position recognition unit 240 may process the acquisition image acquired at each position during the map generation by the map generation unit 220, and recognize the whole area position of the main body in association with the map.

The position recognition unit 240 may determine the current position of the main body by comparing the map with the acquisition image of each position on the map by using the acquisition image of the image acquisition unit 140, so that the current position can be estimated and recognized even when the position of the main body is suddenly changed.

The position recognition unit 240 may analyze various features included in the acquisition image, such as ceiling lights, edge, corner, blob, ridge, or the like. The acquisition image may be input from the image acquisition unit or a second image acquisition unit provided at an upper end of the main body. The position recognition unit 240 may detect the feature from each of the acquisition images. Various methods for detecting features from an image in the field of Computer Vision are well known. Several feature detectors suitable for detecting these features are known, such as Canny, Sobel, Harris&Stephens/Plessey, SUSAN, Shi&Tomasi, Level curve curvature, FAST, Laplacian of Gaussian, Difference of Gaussians, Determinant of Hessian, MSER, PCBR and Gray-level blobs detector, and the like.

The position recognition unit 240 may calculate a descriptor based on each feature point. The position recognition unit 240 may convert the feature point into a descriptor by using a Scale Invariant Feature Transform (SIFT) technique for feature detection. The descriptor may be denoted by an n-dimensional vector. SIFT may detect an unchanging feature with respect to the scale, rotation, and brightness change of a subject of photograph. Even if the same area is photographed with a different posture of the moving robot 1, the unchanging (Rotation-invariant) feature can be detected. Obviously, the present disclosure is not limited thereto, and various other techniques (for example, HOG: Histogram of Oriented Gradient, Haar feature, Fems, Local Binary Pattern (LBP), and Modified Census Transform (MCT)) may be applied.

The position recognition unit 240 may classify at least one descriptor for each acquisition image into a plurality of groups according to a certain sub-classification rule, based on descriptor information acquired through the acquisition image of each position, and may convert the descriptors included in the same group into sub-representative descriptors respectively according to a certain sub-representative rule. For another example, it is also possible to classify all descriptors gathered from acquisition images in a certain area, such as a room, into a plurality of groups according to a certain sub-classification rule, and may convert the descriptors included in the same group into sub-representative descriptors respectively according to a certain sub-representative rule.

The position recognition unit 240 may obtain the feature distribution of each position through such a process. Each position feature distribution may be represented by a histogram or an n-dimensional vector. As another example, the position recognition unit 240 may estimate an unknown current position based on the descriptor calculated from each feature point, without going through a certain sub-classification rule and a certain sub-representative rule.

In addition, when the current position of the moving robot 1 is in an unknown state due to a position leap or the like, the position recognition unit 240 may estimate the current position based on data such as a pre-stored descriptor, a sub-representative descriptor, or the like.

The position recognition unit 240 may acquire the acquisition image through the image acquisition unit 140 at an unknown current position, and detect features from the acquisition image, when various features, such as lights located on the ceiling, an edge, a corner, a blob, a ridge, are determined through the image.

The position recognition unit 240 may convert into position information (e.g., feature distribution of each position) to be compared in accordance with a certain sub-transformation rule and comparable information (sub-recognition feature distribution), based on at least one recognition descriptor information acquired through the acquisition image of an unknown current position. According to a certain sub-comparison rule, each position feature distribution may be compared with each recognition feature distribution to calculate each similarity. The similarity (probability) may be calculated according to the above mentioned position corresponding to each position, and the position where the greatest probability is calculated may be determined as the current position.

When the map is updated by the map generation unit 220 during the traveling, the controller 200 may transmit the updated information to the terminal 300 through the communication unit so that the map stored in the terminal and the moving robot 1 can be the same. Accordingly, as the map stored in the terminal 300 and the moving robot 1 is maintained to be the same, the moving robot 1 may clean the specified area in response to the cleaning command from the terminal. In addition, the terminal may display the current position of the moving robot on the map.

When the cleaning command is inputted, the travel controller 230 may control the travel drive unit to move to the specified area of the cleaning area, and operate the cleaning unit to perform the cleaning together with the traveling. When a cleaning command for a plurality of areas is inputted, the travel controller 230 may control to move to the area according to the setting of priority area or the specified order to perform cleaning. When a separate cleaning order is not specified, the travel controller 230 may control to move to, based on the current position, a near area or an adjacent area according to the distance and perform cleaning.

In addition, when a cleaning command for an arbitrary area is input regardless of the area division, the travel controller 230 may control to move to an area included in the arbitrary area and perform cleaning. When the virtual wall is set, the travel controller 230 may determine the virtual wall and control the travel drive unit, based on the coordinate value input from the map generation unit 220. Even if it is determined by the obstacle recognition unit 210 that the obstacle does not exist, the travel controller 230 may recognize that an obstacle exists at a corresponding position and restrict the traveling, when the virtual wall is set.

When the setting of the virtual wall is changed during traveling, the travel controller 230 mat reset a travel path by dividing a travelable area and a non-travelable area according to the changed setting of virtual wall. The travel controller 230 may control the traveling in response to any one of a setting 1 for the noise, a setting 2 for the travel path, a setting 3 for avoiding, and a setting 4 for security, according to the attribute set in the virtual wall.

The travel controller 230 may approach the virtual wall and perform a specified operation (travel path, setting 2), may reduce noise generated from the main body and then perform cleaning (noise, setting 1), may not approach the virtual wall within a certain distance from the virtual wall but avoid the virtual wall (avoiding, setting 3), or may photograph an image of a certain area based on the virtual wall (security, setting 4), according to the attribute of the virtual wall.

When the cleaning of the set specified area is completed, the controller 200 may store a cleaning record in the data unit. In addition, the controller 200 may transmit the operation state or the cleaning state of the moving robot 1 to the terminal 300 through the communication unit 190 at certain intervals.

Based on the data received from the moving robot 1, the terminal 300 may display the position of the moving robot together with the map on the screen of the application being executed, and also output information on the cleaning state. The terminal 300 may display either the user map or the guide map on the screen according to the setting, and may change and display the map through the setting.

The terminal 300 may display the received map on the screen, and may change the area by separating or merging the area through a key input or touch input, and may set the attribute of the area by changing or adding the attribute of the area. In addition, the terminal may specify a position on the map for a specific obstacle, and information on a specified obstacle may be transmitted to the moving robot and added to a pre-stored map.

The terminal 300 may specify a cleaning area in response to a key input or a touch input with respect to the displayed map, set a cleaning order, and transmit a cleaning command to the moving robot. In addition, the terminal 300 may display the cleaning state on the displayed map (user map and guide map), based on the data received from the moving robot. When information on an obstacle is added, the terminal may update and display the map based on the received data.

In addition, the terminal 300 may set at least one virtual wall on the map in response to the key input or the touch input. The terminal 300 may include an application or a program for controlling the cleaning of the moving robot 1, and provide a control menu for cleaning area setting and virtual wall.

When the virtual wall is set, the terminal 300 may set the level and attribute for the virtual wall in response to the key input or the touch input. The terminal 300 may classify the virtual wall according to the level, and activate virtual walls having selected levels among a plurality of virtual walls, according to the selected level.

When virtual walls of level 2 is selected in a state where the virtual walls of level 1, 2, and 3 are set, the terminal 300 may activate the virtual walls of level 2 and deactivate the virtual walls of the remaining levels 1 and 3. The terminal 300 may transmit information on the virtual walls of level 2 to the moving robot to perform cleaning. In addition, the terminal 300 may send a cleaning command to the virtual wall of level 1 during the next cleaning.

Accordingly, during every cleaning, the terminal may select the level without changing the position of the virtual wall, so that different virtual wall can be activated whenever cleaning is set to perform the cleaning of the moving robot. When the cleaning command is input, the moving robot may travel by dividing a travelable area and a non-travelable area based on information of set virtual wall.

In addition, the terminal 300 may divide a space by using the obstacle and the virtual wall inside the space. The terminal 300 may divide the area by adding a virtual wall or activating a preset virtual wall to restrict the travelable area of the moving robot. For example, in a case where a plurality of moving robots are provided in one area, the terminal 300 may set a virtual wall so that travel paths between the moving robots are not overlapped, and a space for each moving robot can be divided and assigned.

The terminal may calculate a predicted travel path of the moving robot and display on the screen, based on the travelable area changed by the virtual wall. In addition, when the virtual wall is set, the terminal 300 may control the operation of the moving robot by setting attribute in the virtual wall together with the level.

The terminal 300 may set the attribute to any one of the setting 1 for the noise, the setting 2 for the travel path, the setting 3 for avoiding, and the setting 4 for security in the virtual wall. Thus, the moving robot may approach the virtual wall and perform cleaning while performing a specified operation, or avoid the virtual wall without approaching it, and, in addition, may be set to perform cleaning by reducing a noise or to photograph an image. The terminal 300 may transmit data on the set virtual wall together with a cleaning command to control the operation of the moving robot.

Figure 6:
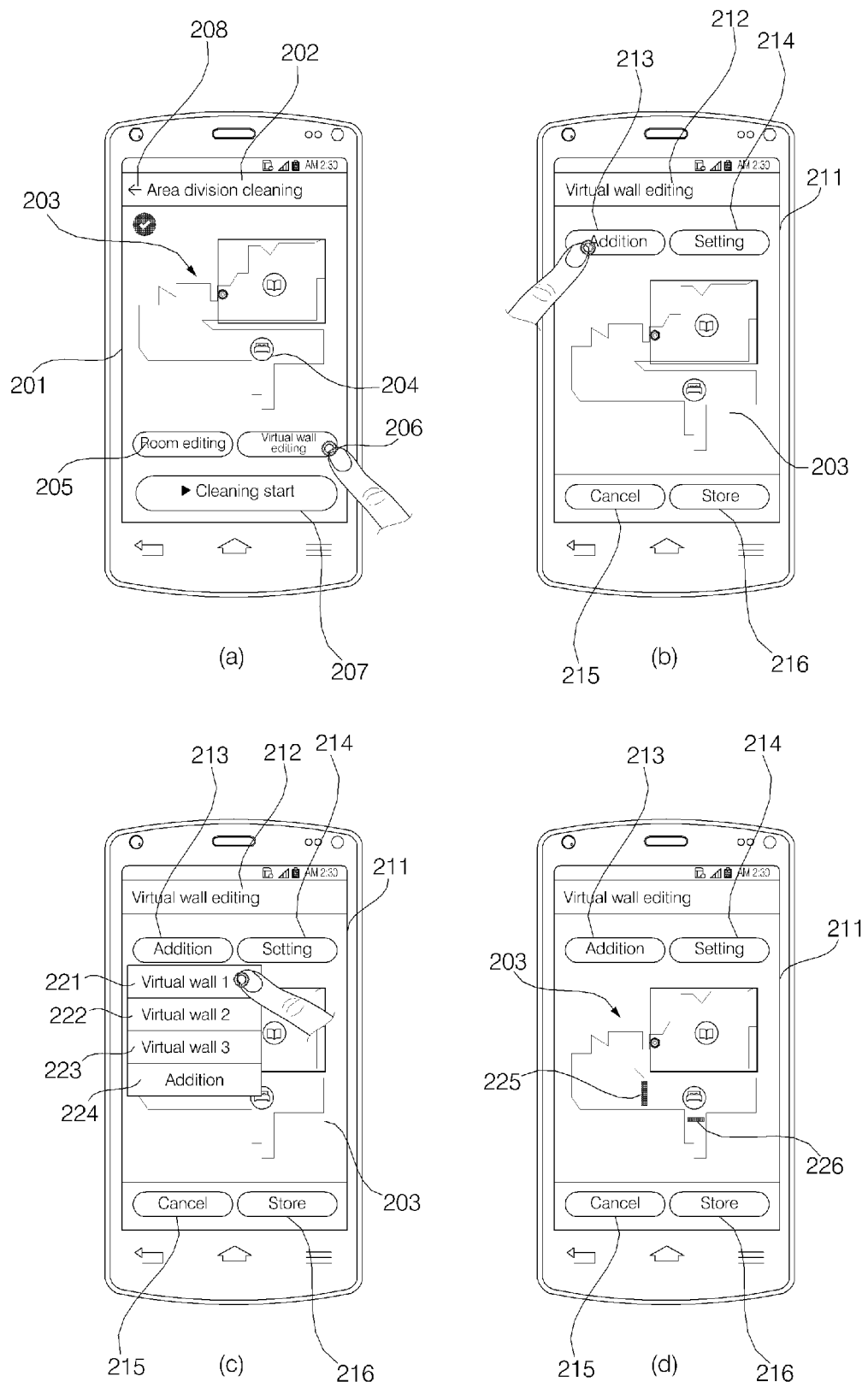
FIG. 6 is an exemplary diagram for explaining a method of setting a virtual wall through a terminal of a moving robot system according to an embodiment of the present disclosure.

FIG. 6 is an exemplary diagram for explaining a method of setting a virtual wall of a moving robot according to an embodiment of the present disclosure. As shown in FIG. 6, the terminal 300 may display a map (map) for the cleaning area generated by the moving robot 1 on the screen.

The terminal 300 may set a virtual wall in the cleaning area in response to the input of the user, based on the displayed map of the cleaning area of the moving robot 1. The virtual wall may be created when a user touches and drags a screen in a specified menu, and may move the position or change the size according to the user's input.

When the virtual wall is set, the terminal 300 may store data about the virtual wall, and transmit data on the position and size of the virtual wall to the moving robot 1. The terminal 300 may display a moving route of the moving robot, which is changed by the virtual wall, on the screen. At this time, the moving route may just roughly indicate an approximate path. The virtual wall may be displayed in the map even when the moving robot 1 performs cleaning.

When virtual wall is set in the cleaning area, the moving robot 1 may recognize that obstacle (wall) exists even though it does not actually exist, and control the traveling. As shown in section (a) of FIG. 6, the terminal 300 may specify an area on an area division cleaning screen 201 and input a cleaning command to the moving robot 1.

The terminal 300 may display, on the area division cleaning screen 201, a map 203 for a cleaning area, a room editing key 205 for modifying a map, a virtual wall editing key 206 for setting a virtual wall, a cleaning start key 207, a current position 204 of moving robot, and a menu name 208. The terminal 300 may selectively display any one of the map displaying the movable area for the cleaning area, a map simplified for the map, and a floor plan.

The virtual wall editing key 206 may be a menu for adding a virtual wall to a map or editing a preset virtual wall. The room editing key 205 may be a menu for modifying the displayed map by modifying the cleaning area. The cleaning start key 207 may transmit a cleaning command to the moving robot 1, and enable the moving robot 1 to perform cleaning according to a specified setting.

When the virtual wall editing key 206 is selected, the terminal 300 may display the virtual wall editing screen 211, as shown in section (b) of FIG. 6. On the virtual wall editing screen 211, the map 203 for the cleaning area may be displayed, and an add key 213 and a setting key 214 for virtual wall, a cancel key 215 for virtual wall setting, and a storage key 216 may be displayed.

When the add key 213 is selected on the virtual wall editing screen 211, the terminal 300 may display a virtual wall addition menu, as shown in FIG. 6(c). At this time, a virtual wall according to the level may be selected through the virtual wall addition menu. A virtual wall 1 (221) may be a selection item for adding a virtual wall of level 1, a virtual wall 2 (222) may be a selection item for adding a virtual wall of level 2, and a virtual wall 3 (223) may be a selection item for adding a virtual wall of level 3, and a virtual wall of other level for selecting an add key 224 may be added.

When the virtual wall 1 (221) is selected, the virtual wall of level 1 (225)(226) may be set in the map 203 displayed on the screen according to the touch and drag input, as shown in section (d) of FIG. 6. When the virtual wall (225)(226) set on the map is selected, the position may be changed or the size may be changed. When the add key 213 is input, a virtual wall may be added, in addition to the set virtual wall. When the setting key 214 is input, a setting menu for changing the setting for a preset virtual wall may be displayed.

In addition, when the cancel key 215 is input, the virtual wall setting may be cancelled, and when the storage key 216 is input, data for the set virtual wall may be stored.

When the cancel key is input or data for the virtual wall is stored, the screen may return to the area division cleaning screen 201 as shown in section (a) of FIG. 6. When the virtual wall is set, a newly set virtual wall may be displayed in the map 203, on the area division cleaning screen. When the virtual wall is set and the cleaning start key 207 is input, the terminal 300 may transmit data on the virtual wall to the moving robot 1, and the moving robot 1 may recognize the set virtual wall as an actual obstacle and control traveling.

Figure 7:
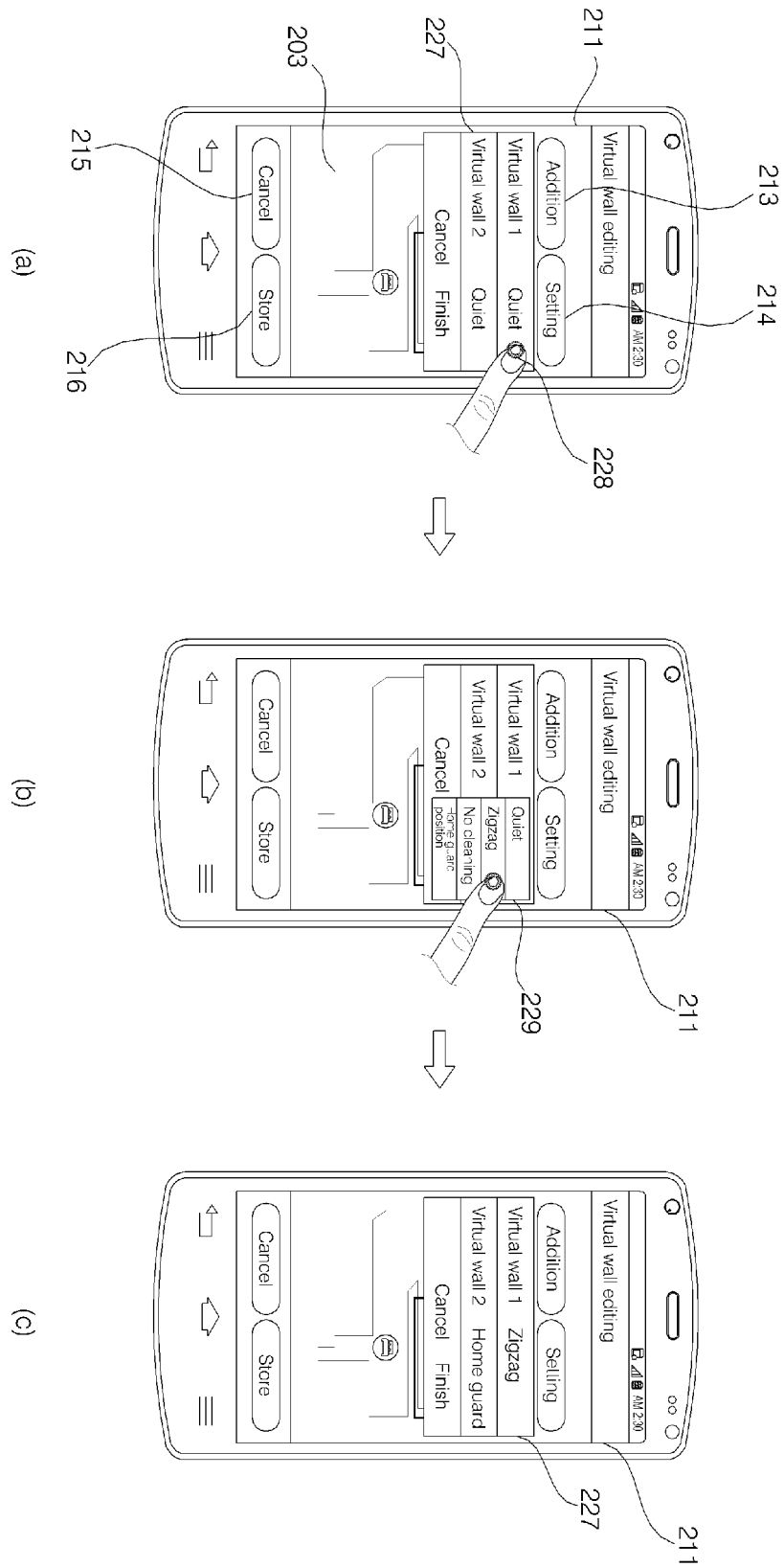
FIG. 7 is an exemplary diagram for explaining a method of setting an attribute of a virtual wall through a terminal of a moving robot system according to an embodiment of the present disclosure.

FIG. 7 is an exemplary diagram for explaining a method of setting an attribute of a virtual wall of a moving robot according to an embodiment of the present disclosure. After setting the virtual wall as described above, when the setting key 214 is selected in the virtual wall editing screen 211, attribute may be set for the set virtual wall.

The attribute of the virtual wall may be a setting for the operation of the moving robot 1 when the moving robot 1 approaches the virtual wall. On the virtual wall editing screen 211, as shown in section (a) of FIG. 7, a virtual wall setting menu 227 may be displayed, and the attribute currently set in a preset virtual wall may be displayed.

When the attribute of the preset virtual wall is selected, an attribute change menu 229 of the virtual wall may be displayed as shown in section (b) of FIG. 7. For example, the attribute of a virtual wall may be set to any one of "quiet", "zigzag", "no cleaning", and "home guard". When the moving robot 1 approaches the set virtual wall, the moving robot 1 may operate according to the attribute set in the virtual wall.

For example, when the virtual wall is set to 'quiet', the moving robot 1 may reduce the noise around the virtual wall to operate. In addition, when the virtual wall is set to 'zigzag', the moving robot 1 may perform cleaning while moving in a zigzag manner with respect to the virtual wall, and, in the case of 'no cleaning', may move to a different area while not approaching the virtual wall. Meanwhile, when 'home guard' is set, an image may be photographed at a certain angle by using an image acquisition unit (camera) provided in the moving robot 1. The photographing position and angle may be set differently according to the level of the virtual wall set to the home guard.

These attributes may be set according to the level of the virtual wall, and may be individually set for each virtual wall. For example, 'quiet' may be set in the virtual wall of level 1 and 'no cleaning' may be set in the virtual wall of level 2. In addition, a virtual wall may be additionally added through the above-described virtual wall addition menu to set a new level or to set a virtual wall having a different attribute. In some cases, when there are a plurality of virtual walls of level 1, the attribute may be individually set. When the attribute for the virtual wall is set, the attribute of the virtual wall according to the level may be changed and displayed as shown in FIG. 7(*c*).

Figure 8:
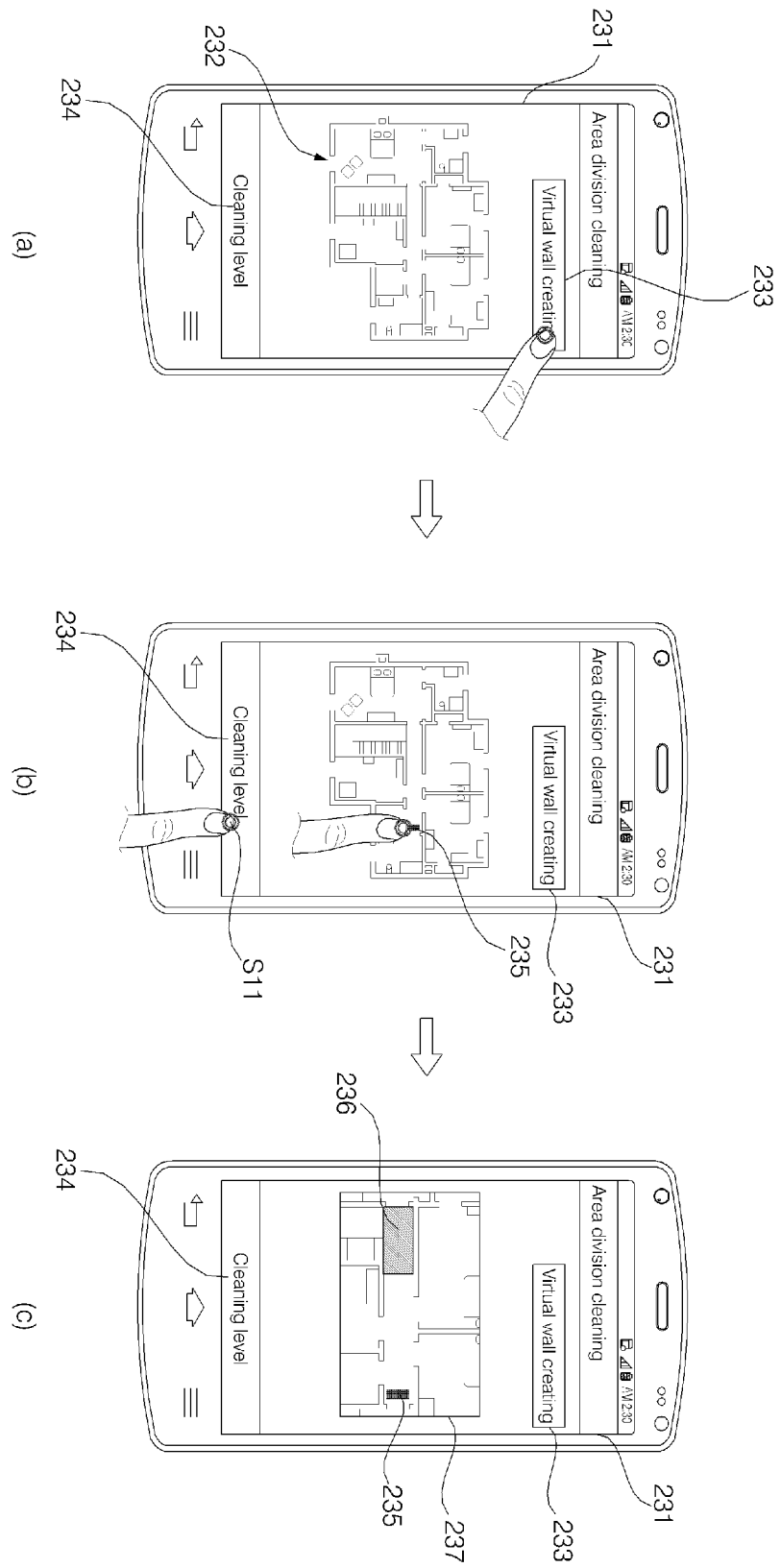
FIG. 8 is an exemplary diagram for explaining another method of setting a virtual wall through a terminal of a moving robot system according to an embodiment of the present disclosure.

FIG. 8 is an exemplary diagram for explaining another method of setting a virtual wall of a moving robot according to an embodiment of the present disclosure. As shown in section (a) of FIG. 8, the terminal 300 may set a virtual wall in response to user input. The area division cleaning screen 231 may display not only the above described cleaning map but also a map for the cleaning area in the form of a floor plan. The displayed map may be changed according to the setting. When a virtual wall creation key 233 provided in the area division cleaning screen 231 is selected, the terminal 300 may add a virtual wall 235 in response to the user's input for the displayed map (floor plan).

As shown in section (b) of FIG. 8, the user may set a virtual wall by touching and dragging a certain area of the map. The additionally set virtual wall may change its position or rotate according to user input, and may change its size. Further, after the virtual wall is set in a specific position, when a cleaning level key 234 is input, the terminal may set the level for the added virtual wall. As described above, the level may be set to level 1, level 2, and level 3, and attributes corresponding thereto may be set.

Figure 9:
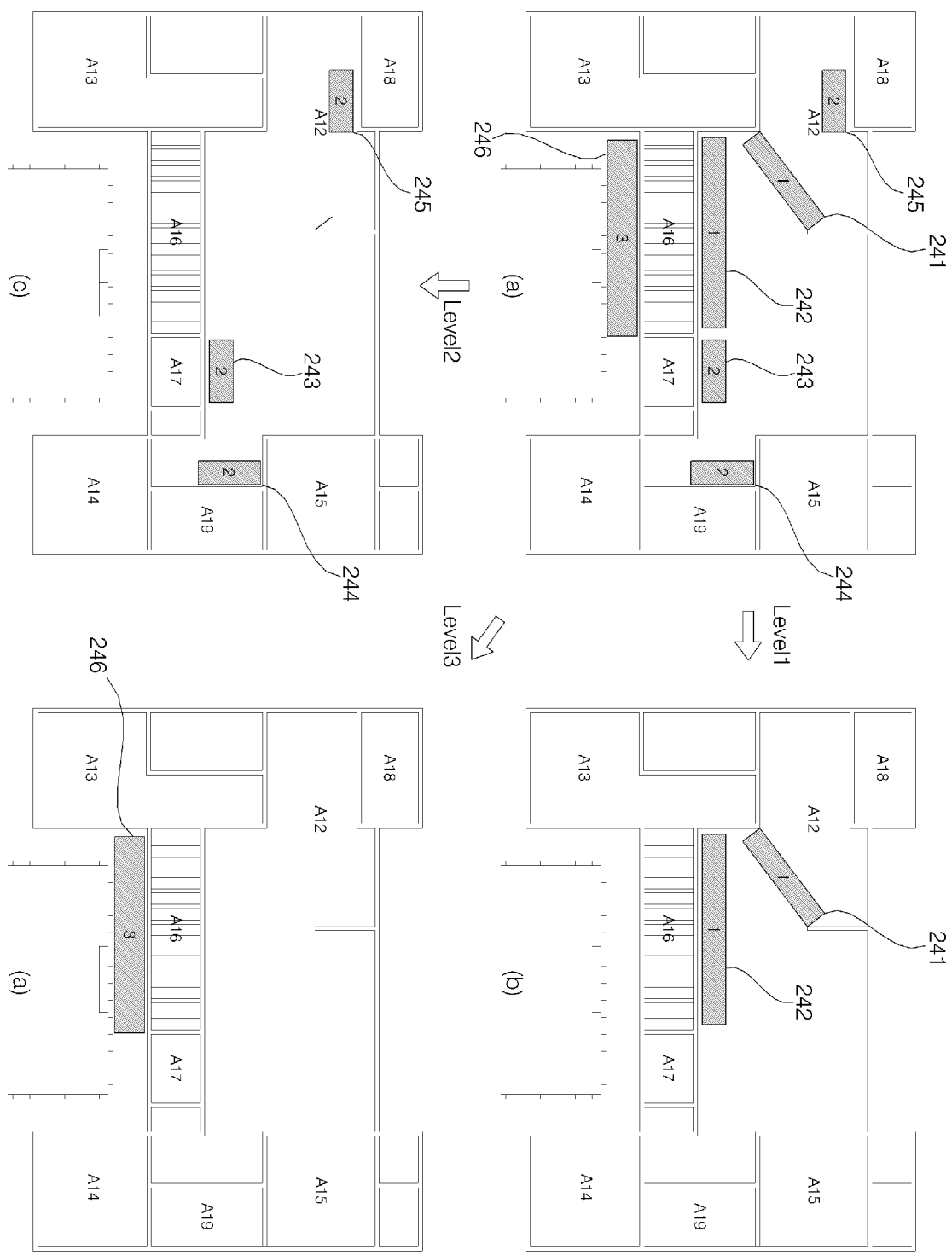
FIG. 9 is an exemplary diagram for explaining a cleaning area of a moving robot according to a selection of a virtual wall according to an embodiment of the present disclosure.

When the first virtual wall 235 and the second virtual wall 236 are additionally set in a certain position, the virtual wall may be displayed in the map as shown in FIG. 9(*c*). The map may be displayed on an enlarged screen 237 by operating the screen.

The virtual walls may be displayed in the same color when the levels are the same, and in different colors when the levels are different. Since the levels of the first virtual wall 235 and the second virtual wall 236 are different from each other, they may be displayed in different colors or patterns.

FIG. 9 shows exemplary diagrams for explaining a cleaning area according to a selection of a virtual wall of a moving robot according to an embodiment of the present disclosure. As shown in section (a) of FIG. 9, a plurality of virtual walls may be set in the cleaning area. A map of the cleaning area may be displayed on the screen of the terminal, and a virtual wall may be displayed on the map. A set level may be displayed in each virtual wall. Although it is shown as an example that the level of the virtual wall is indicated by numeral, it may be displayed by a different color or pattern depending on the level.

An eleventh virtual wall 241 and a twelfth virtual wall 242 may be a virtual wall of level 1 and a thirteenth to fifteenth virtual walls 242 to 245 may be a virtual wall of level 2, and a sixteenth virtual wall 246 may be a virtual wall of level 3. When some of the plurality of virtual walls are selected through the terminal 300, the moving robot 1 may perform cleaning according to the selected virtual wall.

As shown in section (b) of FIG. 9, when a virtual wall of level 1 is selected, the eleventh and twelfth virtual walls 241 and 242, which are virtual walls of level 1, among the plurality of virtual walls, may be activated, and the remaining walls may be excluded. Thus, only the virtual wall of level 1 may be displayed in the map. Basically, the unselected virtual wall may not be displayed on the screen, and, in some cases, may be displayed by a dotted line or turbidly by a gray color.

In addition, as shown in section (c) of FIG. 9, when the virtual wall of level 2 is selected, thirteenth and fifteenth virtual walls 243 to 245, which are virtual walls of level 2, among the plurality of virtual walls, may be activated. The remaining virtual walls of level 1 and level 3 may be deactivated and removed from the screen.

As shown in section (d) of FIG. 9, when the virtual wall of level 3 is selected, the sixteenth virtual wall 256, which is a virtual wall of level 3, may be activated and displayed in the map, and the virtual walls of levels 1 and 2 may be inactivated. Further, a plurality of levels may be selected from among the virtual walls of levels 1 to 3. For example, when the virtual walls of level 1 and level 2, and level 1 and level 3 are selected, the virtual wall of selected level may be activated. The cleanable area of the moving robot may be changed in correspondence to the selected virtual wall.

When cleaning command is input, the terminal 300 may transmit the cleaning command including data on the selected virtual wall to the moving robot 1. Accordingly, the moving robot 1 may set a warning in correspondence to the virtual wall, thereby traveling the area and performing cleaning.

Figure 10:
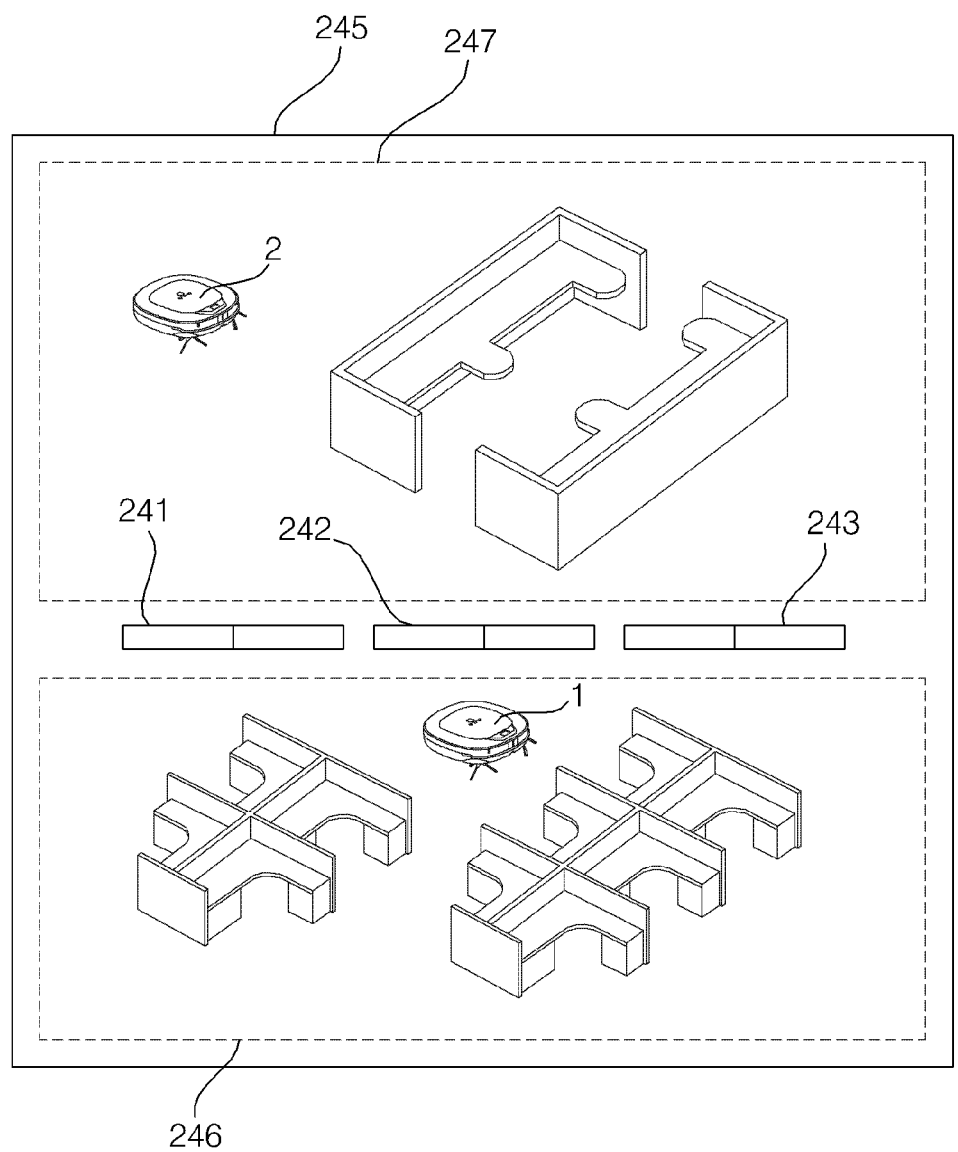
FIG. 10 is an exemplary diagram for explaining a cleaning area of a moving robot according to a virtual wall according to an embodiment of the present disclosure.

FIG. 10 is an exemplary diagram for explaining a cleaning area according to a virtual wall of a moving robot according to an embodiment of the present disclosure. As shown in FIG. 10, a plurality of moving robots may clean a single space. Cleaning may be performed by sharing the cleaned area and the non-cleaned area through communication between the moving robots. In addition, the moving robot may divide an area by using a virtual wall with respect to an area of a certain size or more which is not divided, and perform cleaning for each divided area.

By differently setting virtual walls for a first moving robot 1 and a second moving robot 2, the moving range of each moving robot, i.e., the cleanable area, may be different. Within a cleaning area 245, a plurality of virtual walls, e.g., twenty-first to twenty third virtual walls 241 to 243 may be set. The addition and modification of the virtual wall may be as described above.

When the twenty first to twenty third virtual walls 241 to 243 of level 1 are set for the first moving robot 1, in a state where a plurality of obstacles (desk) are located in the cleaning area, the first moving robot 1 is able to move and perform cleaning only within the first area 246 due to the obstacle and the virtual wall located in the cleaning area. The first moving robot 1 cannot move to a second area 247.

Meanwhile, in the case where a separate virtual wall is not set for the second moving robot 2, the second moving robot 2 may travel the entire cleaning area 245 including not only the first area 246 but also the second area 247. When a virtual wall of level 1 is also applied to the second moving robot 2, the second moving robot may perform cleaning while moving only in the second area. When the first moving robot and the second moving robot perform cleaning in the first area and the second area respectively, the cleaned area can be prevented from overlapping without colliding with each other.

Therefore, by setting a virtual wall in the cleaning area with respect to the moving robot, approaching a specific position can be prevented. In addition, a large area may be divide into a plurality of areas by using the virtual wall, so that cleaning can be performed for each area.

Figure 11:
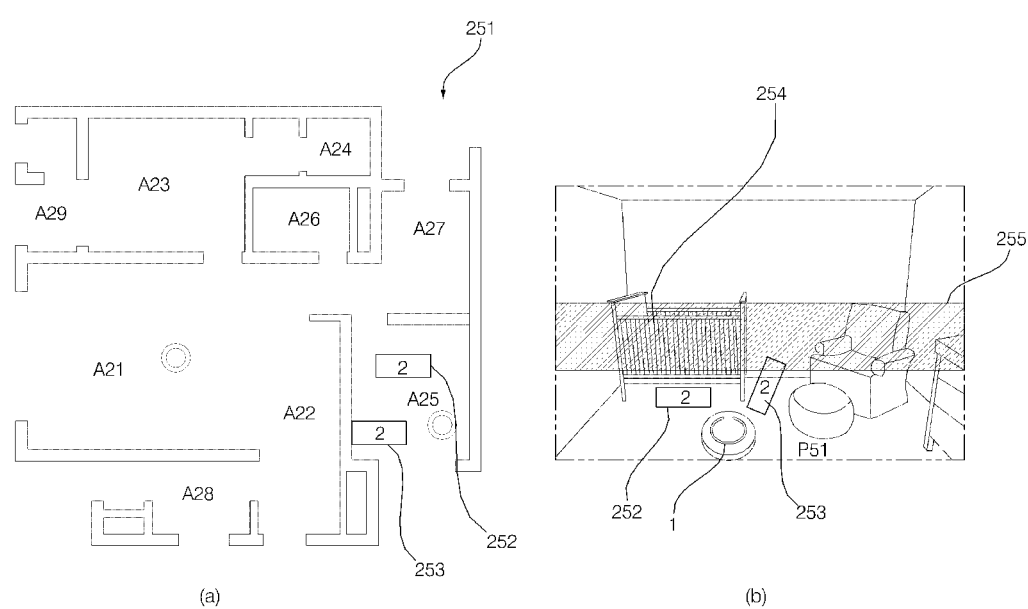
FIG. 11 is an exemplary diagram for explaining a security function using a virtual wall according to an embodiment of the present disclosure.

FIG. 11 is an exemplary diagram for explaining a security function using a virtual wall of a moving robot according to an embodiment of the present disclosure. As shown in FIG. 11, the moving robot 1 may operate as a security function according to the attribute of the virtual wall.

As shown in section (a) of FIG. 11, the terminal 300 may set a thirty first virtual wall 252 and a thirty second virtual wall 253 according to user's input, in a map 251 displayed on the screen. When the level and the attribute for the set virtual wall are set, the terminal 300 may transmit data on the virtual wall to the moving robot.

The moving robot may approach the virtual wall according to the level and the attribute of the virtual wall, or avoid the virtual wall without approaching, and may travel while maintaining a distance uniformly. In addition, as described above, when the virtual wall is set to a home guard, the moving robot may approach the virtual wall, photograph an image in a specified direction in the position of the virtual wall, and may transmit the photographed image to the terminal 300.

In correspondence to the level and the attribute of the virtual wall, when the attribute is a home guard and the level is set to 2, the moving robot may photograph an image at an angle corresponding to the level 2 when reaching the position of the virtual wall.

The moving robot may photograph an image for the front, the 30 degrees upward direction, the 45 degrees upward direction, and the 60 degrees upward direction according to level, with respect to the virtual wall set to the home guard. The photographing angle according to the level may be changed according to the setting.

The moving robot may change the photographing angle according to the installation position of the provided image acquisition apparatus. The photographing angle may be set differently for the case where the image acquisition apparatus is provided on the front surface of the moving robot and for the case where the image acquisition apparatus is installed on the upper surface of the moving robot. In some cases, in order to photograph at a specific angle, a relative position with respect to the virtual wall is set. That is, it is set whether photographing is accomplished in a position where the virtual wall is set or it is set whether photographing is accomplished in a state where the moving robot is spaced apart with a certain distance from the virtual wall. At this time, the photographing angle may be a vertical angle, and the photographing range with respect to the lateral direction may also be changed according to the setting.

As shown in section (b) of FIG. 11, when the virtual wall set to the home guard is level 2, as shown, photographing may be performed at a specified angle with respect to the landscape of the room. For example, when a baby bed 254 is located, virtual walls (thirty first and thirty second virtual walls) around the baby bed may be set so that the moving robot may not approach the baby bed. Further, when the attribute is a home guard, the moving robot may approach the virtual wall to photograph the image of the baby bed.

The terminal 300 may set the level differently according to the position of an object to be photographed, and accordingly, the moving robot may transmit an image of a photographing range 255 specified as a specified angle (vertical angle) to the terminal.

When the virtual wall is set to the home guard, the moving robot may photograph a still image in a position where the virtual wall is set, and may rotate in a unit of 90 degrees to the left or right according to the setting to photograph a plurality of still images. Further, the moving robot may rotate once in the position where the virtual wall is set to photograph a panoramic image of 360 degrees around the virtual wall.

Accordingly, the virtual wall may not only restrict the approaching of the moving robot, but also may set the operation of the moving robot around the virtual wall. For example, the moving robot may perform the prohibition of approaching, the avoidance, the maintenance of certain distance, the cleaning exemption, the security function (home guard), with respect to the virtual wall.

Figure 12:
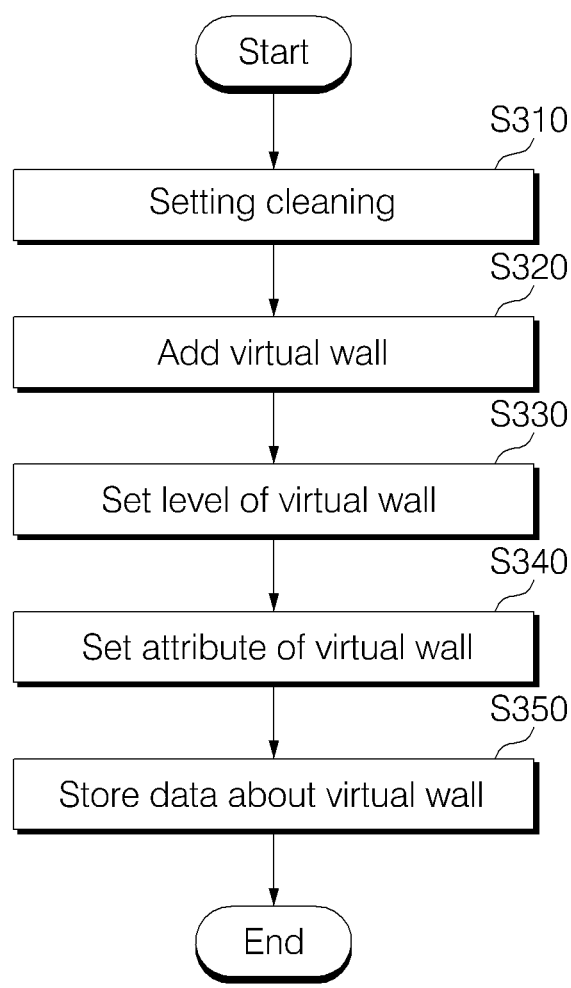
FIG. 12 is a flowchart illustrating a method of setting a virtual wall through a terminal of a moving robot system according to an embodiment of the present disclosure.

FIG. 12 is a flowchart illustrating a method of setting a virtual wall of a moving robot according to an embodiment of the present disclosure. As shown in FIG. 12, the terminal 300 may include a program for controlling the cleaning of the moving robot, and execute a control program in response to a key input or a touch input, thereby displaying a control menu for setting a cleaning operation of the moving robot on a screen (S310).

The terminal 300 may display a pre-stored map or a map generated by the moving robot 1 on the control menu screen, and specify a cleaning area in response to the input. At this time, when a virtual wall editing menu is selected, the terminal 300 may additionally set a virtual wall in at least one area of the map according to the key input or touch input of the user (S320). When there exists a preset virtual wall, the virtual wall may be displayed in the map, and the screen may be updated to include the additionally set virtual wall.

When the virtual wall is added, the terminal 30 may set the level of the virtual wall added through a level setting menu (330), and may set the attribute of the virtual wall added through the attribute setting (S340). The level of the virtual wall may be set according to the travel path of the cleaning area. Level may be set for the approaching restriction according to user's convenience, or may be set for the purpose of dividing the area. In addition, level may be set for the security function (home guard).

In a virtual wall list, the list of preset virtual wall and added virtual wall may be displayed according to the level, and the attribute set for each virtual wall may be displayed. The list of virtual walls may be displayed by a level list.

The attribute of the virtual wall may be set in a unit of level of the virtual wall, and, in some cases, individual attribute may be set for each virtual wall. When the setting for the virtual wall is completed, the terminal 300 may store data about the virtual wall and transmit the data to the moving robot (350).

The terminal may transmit data on the virtual wall while transmitting the cleaning command. Accordingly, the moving robot may update the map to include information on the virtual wall, and travel to avoid or approach the virtual wall according to the attribute of the virtual wall during travel, and perform cleaning while moving the travelable area in accordance with the virtual wall. In addition, when the home guard is set, an image is photographed at a specified angle from the virtual wall and transmitted to the terminal.

Figure 13:
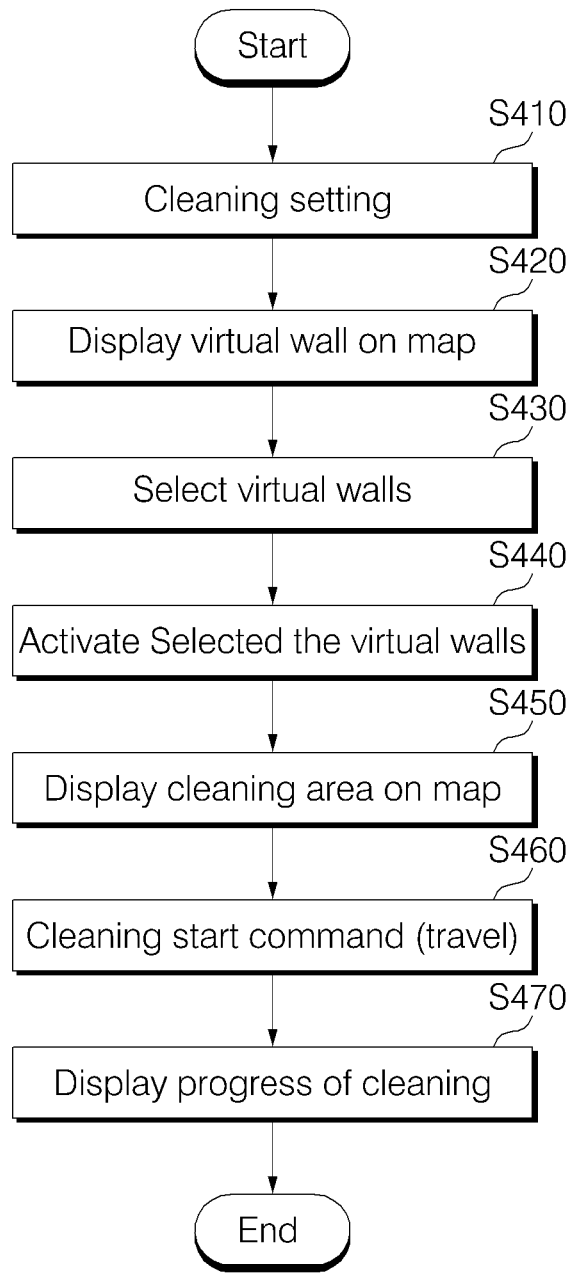
FIG. 13 is a flowchart illustrating a method of selecting a virtual wall through a terminal of a moving robot system according to an embodiment of the present disclosure.

FIG. 13 is a flowchart illustrating a method of selecting a virtual wall of a moving robot according to an embodiment of the present disclosure. As shown in FIG. 13, the terminal 300 may set a virtual wall in a cleaning area to be cleaned by the moving robot through an area specification screen and a virtual wall setting screen, and input a cleaning command corresponding thereto.

In response to the input, the terminal 300 may execute a control program for controlling the moving robot to perform cleaning setting of the moving robot (S410). When a preset virtual wall exists, the terminal 300 may display the virtual wall in the map (S420). The terminal 300 may display a different color or different pattern according to the level of the virtual wall, and display a set level as the case may be.

In response to the user input, the terminal 300 may select some of the plurality of virtual walls set in the area to be cleaned (S430). The displayed virtual wall may be individually selected or the virtual wall may be selected on a level-by-level basis.

The terminal 300 may allow the virtual wall of the selected level or selected the virtual walls, among a plurality of virtual walls on the map, to be activated and displayed (S440). For example, when the virtual wall of level 1 is selected, the terminal 300 may activate the virtual wall of level 1 among the plurality of virtual walls on the map, and display differently to distinguish the activated virtual wall from the non-selected virtual wall.

The terminal 300 may delete or deactivate the remaining virtual walls of level 2 or level 3 from the screen. For example, the virtual wall may be dotted or grayed. When a plurality of virtual wall levels are selected, the terminal 300 may activate and display a virtual wall corresponding to the selected level.

The terminal 300 may display a cleaning area for the movable area of the moving robot in correspondence to the position of the selected virtual wall, and calculate and display a moving route on the screen (S450). The terminal 300 may display the moving route of the moving robot on the map in a line form and may display a numeral according to the moving order.

When the area is divided by the virtual wall, the terminal 300 may temporarily divide the area according to the position of the obstacle and the position of the virtual wall, and display them as different areas. When the cleaning command is input (S460), the terminal 300 may transmit data on the position of set virtual wall, the selected level, and the attribute of virtual wall along with the cleaning command to the moving robot.

The moving robot may perform cleaning while traveling the cleaning area according to the received data, and transmit information on the obstacle found during the traveling and data on the progress state of the cleaning to the terminal 300. The terminal 300 may display the data received from the moving robot on the screen (S470), so that the user can check the progress of cleaning.

Figure 14:
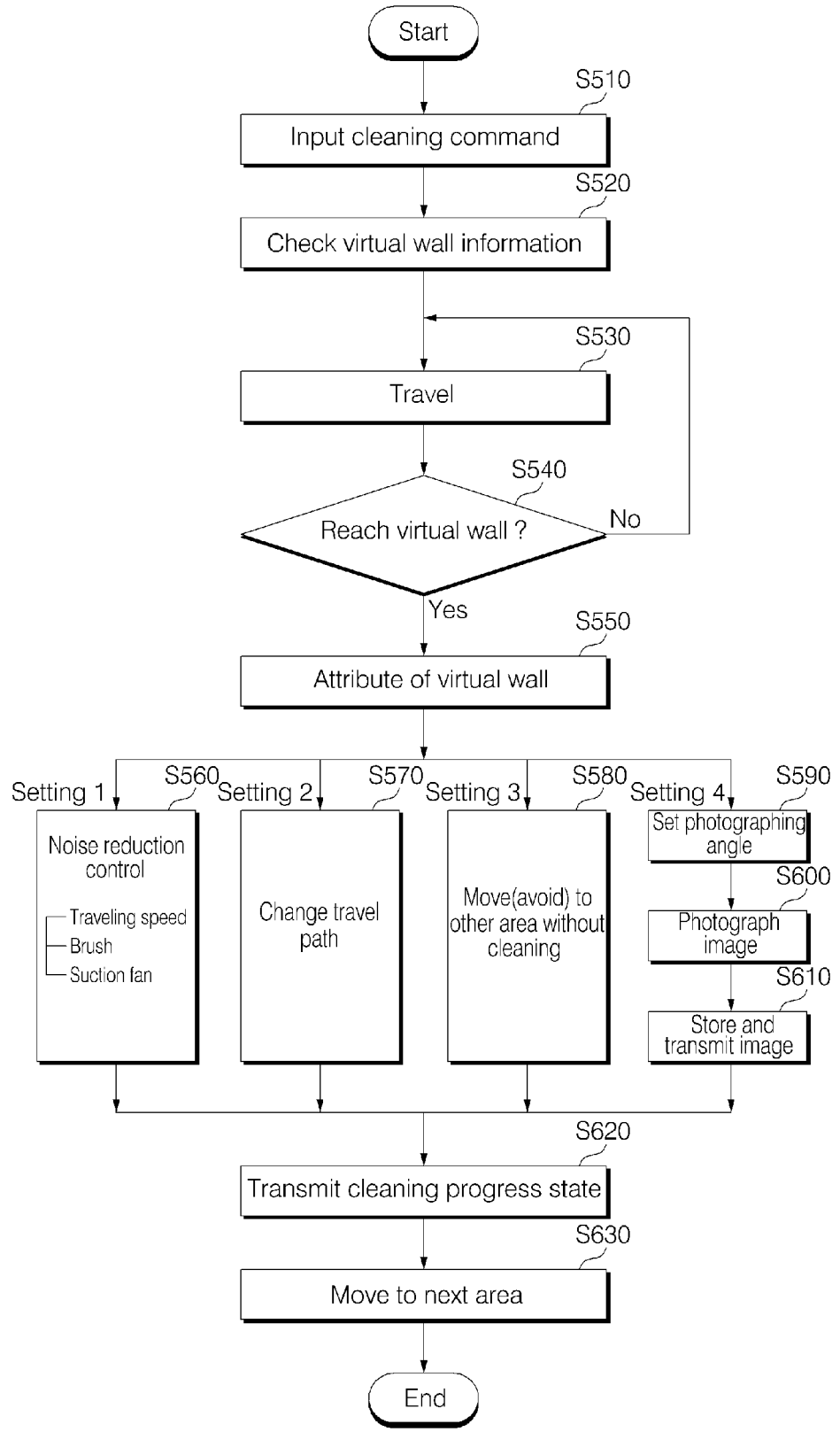
FIG. 14 is a flowchart illustrating a method of cleaning of a moving robot according to a virtual wall through a terminal of a moving robot system according to an embodiment of the present disclosure.

FIG. 14 is a flowchart illustrating a method of cleaning according to a virtual wall of a moving robot according to an embodiment of the present disclosure. As shown in FIG. 14, when a cleaning command is input according to a key input or a signal received from the terminal (S510), the moving robot 1 may check virtual wall information (S520).

The moving robot 1 may check the virtual wall information which is previously received and stored in the data unit or stored together with the map. The moving robot 1 may receive the virtual wall information from the terminal together with the cleaning command. In addition, the moving robot 1 may receive the virtual wall information from the terminal even when performing cleaning and may apply the received information to a cleaning operation.

The moving robot 1 may determine the cleaning area according to the cleaning command and the cleaning area according to the virtual wall position to set a traveling warning. The moving robot 1 may exclude the area in which it is not possible to travel due to the virtual wall from the cleaning area.

The moving robot 1 may travel the cleaning area according to the cleaning command and perform cleaning (S530). When the moving robot 1 reaches the virtual wall (S540), the attribute set in the virtual wall may be determined (S550).

As described above, the level and attribute of the virtual wall may be set in the virtual wall. The attribute of the virtual wall may be set, for example, to the approaching, the avoidance, the certain distance maintenance, the noise reduction, the zigzag traveling, the home guard, and the like.

When the attribute corresponds to the setting 1 for noise, the moving robot 1 may reduce the noise generated from the moving robot (S560), and then clean the surrounding of the virtual wall. For example, the moving robot 1 may decrease the traveling speed, and control the rotation speed of a brush, the number of the operating brushes, and the rotation speed of the suction fan to reduce the generated noise.

In addition, when the attribute of the virtual wall is the setting 2 relating to the traveling, the moving robot 1 may change the travel path according to the specified traveling setting around the virtual wall (S570). For example, with respect to traveling, the moving robot 1 may perform cleaning while moving zigzag based on the virtual wall when zigzag traveling is set, and move along the virtual wall when wall following is set.

When the attribute of the virtual wall is the setting 3 for avoidance, the moving robot 1 may not approach the virtual wall any more but avoid the virtual wall (S580). The moving robot 1 may not perform cleaning around the virtual wall but may immediately move to other area (not cleaned area), or move to a specified next area to avoid the virtual wall.

In the setting 3 for avoidance, the moving robot 1 may set an approaching restriction distance such as 30 cm, 1 m according to a detailed setting, control the travel so as not to approach within a specified approaching restriction distance, and may immediately change the traveling direction and move to the next area when determining the virtual wall.

When the attribute of the virtual wall is the setting 4 for security, the moving robot 1 may photograph an image by using a provided image photographing unit (camera). For example, when home guard is set, the moving robot 1 may set a photographing angle for up, down, left, and right directions of the provided image photographing unit (camera) (S590), and photograph an image of specified area (S600). The moving robot 1 may photograph a panoramic picture for a specified area as well as a snapshot, and may also photograph a moving image. The moving robot 1 may perform photographing at a preset photographing angle, and may perform photographing by changing the photographing angle according to the level of the virtual wall.

The moving robot 1 may store the photographed image (including the moving image) and transmit to a specified terminal 300 (S610). The moving robot 1 may periodically transmit the cleaning progress state and the position of the moving robot to the terminal 300 (S620). Accordingly, the terminal may update and display the position of the moving robot in the map displayed on the screen, and may display the cleaned area and the non-cleaned area differently.

The moving robot 1 may move to the next area according to the cleaning setting and perform cleaning (S630). Accordingly, the moving robot 1 of the present disclosure may generate a map based on detected obstacle information, and perform cleaning based on the generated map. The terminal may set a plurality of virtual walls in the cleaning area, and specify level and attribute for the virtual wall.

By using a virtual wall, aspects of the present disclosure may set a cleaning area of the moving robot or may restrict a movable area, may divide a space into a plurality of spaces, and control the moving robot to perform a specified operation according to the attribute of the virtual wall. The present disclosure provides a moving robot system capable of restricting travel of a moving robot by setting a plurality of virtual walls in which approach rights of the moving robot are set differently within a cleaning area, and a control method thereof.

In accordance with an aspect of the present disclosure, a moving robot system includes: a moving robot which travels a cleaning area, generates a map for the cleaning area, and moves based on the map; and a terminal which receives the map, sets at least one virtual wall in the map, and transmits the virtual wall to the moving robot, and the moving robot divides a travelable area in correspondence to the virtual wall and performs cleaning while traveling the cleaning area, and performs a specified operation according to the attribute specified to the virtual wall when reaching the virtual wall.

The moving robot sets the virtual wall in a pre-stored map in correspondence to data about the virtual wall received from the terminal, and sets a travel path by dividing the travelable area in the cleaning area. The moving robot performs any one of a noise control, a travel path change, an avoidance travel, and a security function according to the attribute set in the virtual wall, when reaching the virtual wall during traveling.

The terminal sets at least one virtual wall in the map in response to the input data, and sets a level or an attribute for the virtual wall. The terminal divides the virtual wall according to the level, and activates the virtual wall of a selected level and deactivates the virtual wall of a remaining level. The terminal controls an operation of the moving robot by setting an attribute of the virtual wall to any one of a noise control, a travel path change, an avoidance travel, and a security function.

In accordance with another aspect of the present disclosure, a method of controlling a moving robot system includes: generating a map of a cleaning area, by a moving robot; setting a virtual wall in the map, by a terminal received the map; setting an attribute or a level for controlling an operation of the moving robot in the virtual wall, by the terminal; setting a travel path along the virtual wall so that the moving robot performs cleaning while traveling; and performing a specified operation according to the attribute set in the virtual wall when the moving robot reaches the virtual wall during traveling.

The moving robot system and the control method of the same according to present disclosure set a virtual wall in the cleaning area where the moving robot travels through a map, control the moving robot as if an actual physical obstacle exists by matching the virtual wall with the cleaning area, so that it is possible to control the travel of the moving robot without installing an apparatus for generating an actual signal, and it is possible to set a plurality of virtual walls at a desired position irrespective of the number, without a space restriction, and without disturbing the movement of the user in the area.

The present disclosure sets a level in a virtual wall and sets approach rights for a cleaning area differently according to the level so that some virtual walls among a plurality of virtual walls are selectively activated without the need of changing or newly setting the virtual wall at every cleaning to be applied to the cleaning area. Accordingly, the virtual wall can be easily set, and the cleaning area can be changed according to the activated virtual wall to perform necessary cleaning.

In addition, the present disclosure sets an attribute in the virtual wall, and does not unconditionally avoid with respect to the virtual wall, but, according to the attribute of the virtual wall, the moving robot approaches the virtual wall and performs cleaning or operates with low noise, performs cleaning with a specified movement, photographs an image, and perform a specified operation.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims. Accordingly, the scope of the present disclosure is not construed as being limited to the described embodiments but is defined by the appended claims as well as equivalents thereto.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A system comprising:
   an autonomous cleaner which travels in a cleaning area, the autonomous cleaner including a controller that generates a map of the cleaning area, and manages a movement of the autonomous cleaner based on the map; and
   a terminal which receives the map, sets at least one virtual wall in the map, and transmits information associated with the virtual wall to the autonomous cleaner,
   wherein the terminal
      sets an attribute related to controlling an operation of the autonomous cleaner with respect to a location associated with the virtual wall,
      sets a level of a plurality of levels,
      activates a virtual wall of the set level, and
      deactivates a virtual wall of another level, of the plurality of levels, that differs from the set level, and
   wherein the autonomous cleaner divides a travelable area based on the virtual wall, performs cleaning while traveling in the cleaning area, and performs a specified operation according to the attribute assigned to the virtual wall when reaching the location associated with the virtual wall.

2. The system of claim 1, wherein the autonomous cleaner sets a travel path by dividing the travelable area in the cleaning area, updates data on the virtual wall, and resets the travel path, when new data for the virtual wall is received from the terminal during traveling.

3. The system of claim 1, wherein
   the attribute set by the terminal relates to at least one of a noise control, a travel path change, an avoidance travel, or a security function in the virtual wall, and
   the autonomous cleaner performs a motion according to the attribute of the virtual wall, when the autonomous cleaner reaches the location associated with the virtual wall during traveling.

4. The system of claim 3, wherein, the autonomous cleaner performs the noise control, according to the attribute of the virtual wall, by at least one of reducing a traveling speed, modifying a rotation speed control of a suction fan, or a brush control to reduce noise.

5. The system of claim 3, wherein the autonomous cleaner changes the travel path according to the attribute of the virtual wall, and performs cleaning while traveling a surrounding area of the virtual wall in a zigzag manner or moving along the virtual wall.

6. The system of claim 3, wherein the autonomous cleaner moves to a next area without approaching within a specified distance from the virtual wall, when the attribute of the virtual wall is set to avoidance travel.

7. The system of claim 3, wherein the autonomous cleaner includes an image sensor that captures an image of a specified area at a certain photographing angle and transmits the image to the terminal, when the attribute of the virtual wall is set the security function, wherein the image sensor captures the image in a form of at least one of a still cut image, a panoramic image, or a moving image for the specified area.

8. The system of claim 7, wherein the autonomous cleaner determines the level specified to the virtual wall, and changes the photographing angle of the image sensor according to the level to capture the image.

9. The cleaner system of claim 1, wherein the terminal sets the attribute according to the level of the virtual wall.

10. The cleaner system of claim 1, wherein the terminal sets an individual attribute in the virtual wall.

11. The system of claim 1, wherein the terminal controls a traveling of the autonomous cleaner by separating the cleaning area into a plurality of areas by using information of an obstacle displayed in the map and the virtual wall.

12. The system of claim 11, wherein the terminal separates an area through the virtual wall so that travel paths of a plurality of autonomous cleaners are not overlapped, when the plurality of autonomous cleaners are present in one area.

13. A method of controlling an autonomous cleaner system, the method comprising:
generating, by an autonomous cleaner, a map of a cleaning area;
setting at least one virtual wall in the map, by a terminal receiving the map;
setting, by the terminal, an attribute related to controlling an operation of the autonomous cleaner in the virtual wall;
setting at least one level, of a plurality of levels, for the virtual wall;
activating one or more virtual walls of the at least one set level, and deactivating one or more virtual walls of another level, of the plurality of levels, that differs from the set level;
setting a travel path along the virtual wall so that the autonomous cleaner performs cleaning while traveling; and
performing, when the attribute is set, a specified operation when the autonomous cleaner reaches the virtual wall during traveling.

14. The method of claim 13, further comprising:
displaying the activated virtual wall and the deactivated virtual wall on the map;
transmitting, by the terminal, information on the activated virtual wall to the autonomous cleaner; and
resetting, by the autonomous cleaner, the travel path according to the activated virtual wall.

15. The method of claim 13, further comprising:
separating, by the terminal, any one area in the cleaning area through the virtual wall, when a plurality of autonomous cleaners are located in the cleaning area; and
transmitting a cleaning command to the plurality of autonomous cleaners so that travel paths of the plurality of autonomous cleaners do not overlap.

16. The method of claim 13, wherein setting the attribute in the virtual wall includes setting the attribute of the virtual wall so that the autonomous cleaner performs at least one of a noise control, a travel path change, an avoidance travel, or a security function.

17. The method of claim 13, further comprising performing at least one of a traveling speed reduction, a rotation speed control of a suction fan, or an operation control of a brush to reduce noise and continue traveling, by the autonomous cleaner, according to a noise control attribute of the virtual wall, when the autonomous cleaner reaches a location associated with the virtual wall.

18. The method of claim 13, further comprising
performing cleaning while traveling a surrounding area of the virtual wall in a zigzag manner or moving along the virtual wall, by the autonomous cleaner, according to a travel path change attribute of the virtual wall, when the autonomous cleaner reaches the virtual wall; and
moving to a next area while not approaching within a specified distance from the virtual wall to avoid the virtual wall, by the autonomous cleaner, according to an avoidance travel attribute of the virtual wall, when the autonomous cleaner reaches the virtual wall.

19. The method of claim 13, further comprising:
capturing an image of a specified area at a certain photographing angle through a photo sensor, by the autonomous cleaner, according to a security function attribute of the virtual wall, when the autonomous cleaner reaches the virtual wall; and
transmitting the image to the terminal.

20. The method of claim 13, further comprising:
setting the attribute according to the level of the virtual wall.

* * * * *